US012600161B2

(12) United States Patent (10) Patent No.: US 12,600,161 B2
Jolic (45) Date of Patent: Apr. 14, 2026

(54) MICRO-OPTIC DEVICE FOR PRODUCING A MAGNIFIED IMAGE

(71) Applicant: CCL Secure Pty Ltd, Craigieburn (AU)

(72) Inventor: Karlo Jolic, Craigieburn (AU)

(73) Assignee: CCL Secure Pty Ltd, Craigieburn (AU)

( * ) Notice: Subject to any disclaimer, the term of this patent is extended or adjusted under 35 U.S.C. 154(b) by 831 days.

(21) Appl. No.: 17/840,311

(22) Filed: Jun. 14, 2022

(65) Prior Publication Data

US 2022/0305836 A1 Sep. 29, 2022

Related U.S. Application Data

(63) Continuation of application No. PCT/AU2020/051384, filed on Dec. 16, 2020.

(30) Foreign Application Priority Data

Dec. 19, 2019 (AU) ................................ 2019904818

(51) Int. Cl.
*B42D 25/378* (2014.01)
*B41M 3/14* (2006.01)
*G02B 3/00* (2006.01)
(52) U.S. Cl.
CPC ............. *B42D 25/378* (2014.10); *B41M 3/14* (2013.01); *G02B 3/0012* (2013.01);
(Continued)

(58) Field of Classification Search
CPC ...... B42D 25/378; B42D 25/324; B41M 3/14; G02B 3/0012; G02B 3/00; G02B 3/0056; G02B 3/0068; G02B 2003/0093
(Continued)

(56) References Cited

U.S. PATENT DOCUMENTS 6,404,555 B1 6/2002 Nishikawa
2018/0196166 A1 7/2018 Zhang
(Continued)

FOREIGN PATENT DOCUMENTS

AU 2016100402 A4 * 5/2016 ............ B42D 25/29
WO WO 94/27254 A1 11/1994
(Continued)

OTHER PUBLICATIONS

French Patent and Trademark Office, Office Action, French Patent Application No. FR2013700, Aug. 16, 2023, 14 pages.
(Continued)

*Primary Examiner* — Justin V Lewis
(74) *Attorney, Agent, or Firm* — Mintz, Levin, Cohn, Ferris, Glovsky and Popeo, P.C.; Daniel R Brownstone

(57) ABSTRACT
The present disclosure relates to a micro-optic device for producing a magnified image, including: a first unitary structure on one side of a substrate, the first unitary structure including a first group of focusing elements and a first group of imagery elements, wherein one of the first group of focusing elements and the first group of imagery elements is recessed with respect to the other, wherein the device further includes at least a first coating of ink overprinted on the first unitary structure, to at least partially fill the recessed group of elements, and wherein a property of the ink provides a visual contrast in the magnified image.

14 Claims, 15 Drawing Sheets

(52) U.S. Cl.
CPC ......... *G02B 3/0056* (2013.01); *G02B 3/0068* (2013.01); *G02B 2003/0093* (2013.01)

(58) Field of Classification Search
USPC ... 283/67, 72, 91, 94, 95, 98, 109, 110, 111, 283/901
See application file for complete search history.

(56) References Cited

U.S. PATENT DOCUMENTS

| | | |
|---|---|---|
| 2018/0229536 A1 | 8/2018 | Gettens et al. |
| 2019/0092082 A1* | 3/2019 | Jolic .................... B42D 25/324 |
| 2019/0275824 A1 | 9/2019 | Lister |
| 2021/0023870 A1* | 1/2021 | Jolic ........................ G07D 7/20 |
| 2021/0070088 A1 | 3/2021 | Fuhse et al. |

FOREIGN PATENT DOCUMENTS

| | | |
|---|---|---|
| WO | WO 2017/177276 A1 | 10/2017 |
| WO | WO 2017/177278 A1 | 10/2017 |
| WO | WO 2019/000048 A1 | 1/2019 |
| WO | WO 2019/006497 A1 | 1/2019 |

OTHER PUBLICATIONS

International Preliminary Report on Patentability, Chapter II, Patent Cooperation Treaty Application No. PCT/AU2020/051384, Feb. 17, 2022, 6 pages.
International Search Report and Written Opinion, Patent Cooperation Treaty Application No. PCT/AU2020/051384, Jan. 29, 2021, 12 pages.

* cited by examiner

120

130

601

602

600

620

622

620

621

MICRO-OPTIC DEVICE FOR PRODUCING A MAGNIFIED IMAGE

CROSS-REFERENCE TO RELATED APPLICATIONS

This application is a bypass continuation application of International PCT Application No. PCT/AU2020/051384, filed on Dec. 16, 2020, which claims priority to Australian Patent Application No. 2019904818, filed on Dec. 19, 2019, which are incorporated by reference herein in their entirety.

TECHNICAL FIELD

The present invention relates to a micro-optic device for producing a magnified image. Embodiments of the invention can be used as a security device for bank notes, credit cards, cheques, passports, identity cards and the like, and it will be convenient to describe the invention in relation to that exemplary, non-limiting application.

BACKGROUND OF INVENTION

It is well-known that many of the world's bank notes as well as other security documents include security devices which produce optical effects enabling a visual authentication of a bank note. Some of the security devices include micro lenses which act to sample and magnify micro-imagery elements and project a magnified image which is observable by a user.

In some micro optic security devices, the focusing elements are formed by an embossing process. The imagery elements are subsequently formed by an additional process, typically a printing process or an additional embossing process specific for creating the imagery in a separate layer from the layer containing the focusing elements.

In such security devices, it is difficult to control the phase of the focusing elements relative to the imagery elements, as they are usually formed by different processes, or by different units on the same printing press. This can result in images being projected to a user being different from one bank note to the next, giving the impression that the intended security feature appears different or inconsistent from one bank note to the next. This problem is particularly evident in optical effects such as flips, animations and 3D images. Depending on the phase relationship of the focusing elements and the imagery elements, an animation or flip can project any one of its frames to a user at a fixed viewing angle.

Similarly, an interlaced 3D image or an integral image will vary significantly in appearance for a given viewing angle depending on the phase of the focusing elements relative to the imagery elements. Typically, there will exist some phases that will project a clean 3D image when the bank note is viewed directly at a normal viewing angle, and there will be other phases that will project a blurry image at a normal viewing angle that is uncomfortable to view—the user may see both "left" and "right" images of the stereoscopic pair with both eyes, making it difficult for the brain to reconcile depth/float. Phase variation will also impact on moiré imagery designs—the position of the moiré-magnified images in the magnified array, will vary in accordance with the phase.

In such security devices there will also typically exist a rotational skew between the focusing elements and the imagery elements, that is, a rotation around an axis perpendicular to the plane of the substrate on which the focusing elements are formed. Depending upon its size, this skew can introduce undesirable image artefacts. For example, in the case of moiré imagery designs, the magnified images can appear tilted and their size can also vary, depending on the level of relative skew. Similarly, in the case of interlaced 3D designs and integral images, these can appear tilted to an extent that is aesthetically undesirable.

The variations in relative phase in the plane of the substrate on which the focusing elements are formed (in the X,Y axes) and the relative skew (rotation about the Z axis perpendicular to the plane of the substrate), when combined, can result in large variations in the appearance of imagery projected to a user.

The imagery layer and the layer containing the focusing elements can also be stretched by different amounts in different directions during the manufacturing process, resulting in variations in the frequency (pitch) of the imagery elements and/or focusing elements. Such differences can lead to distortions in the projected images that cannot be compensated for through design, because the variations involved are not able to be sufficiently controlled in the manufacturing process. In the case of a roll-to-roll manufacturing process there may be tension variations/slack in the web during processing that cause different degrees of stretch that cannot be sufficiently controlled to eliminate distortion in the projected image. In the case of a sheet-fed manufacturing process there may be tension variations/slack in each sheet during processing that cause different degrees of stretch that cannot be sufficiently controlled to consistently eliminate distortion in the projected image.

Australian Innovation Patent No. 2016100402, in the name of the present Applicant, addresses the aforementioned issues by providing a micro-optic device in which a unitary structure including both focusing or focusing elements and imagery elements is provided on one or both sides of a transparent substrate. An exemplary unitary structure 10 of the type described in this Australian innovation patent is shown in FIG. 1. The unitary structure 10 includes a series of micro-lenses, such as the micro-lens 12, and a series of micro-imagery elements in the form of an "A", such as the micro-imagery element 14.

It can be seen from FIG. 1 that the micro-imagery elements 14 protrude relative to the micro lenses 12. In this example, the micro-focusing elements are 75 microns wide, and have a sag of 10 microns from the apex to the periphery of the micro focusing elements. The micro focusing elements are located on a rectangular grid having a grid pitch of 75 microns, and the micro-imagery elements protrude at least 5 microns from the lens surface. The pitch of the series of micro-imagery elements is slightly different to that of the micro lenses.

Placing a mirror or other reflective surface on the reverse side of a substrate on which the unitary structure 10 is formed, at the correct distance, allows each micro-lens to focus on the portion of its corresponding micro-imagery element in the unitary structure, thus producing a moiré magnified "A" projected image. The image formation largely relies on the sidewalls of the "A" structure directing light either towards or away from an observer. The representative image 20 shown in FIG. 2 depicts a simulation of how the resulting magnified image looks in reflected light, and as depicted the magnified image contrast is low.

The aforementioned Australian innovation patent suggests that one way to increase contrast of the magnified image produced by the arrangement depicted in FIG. 1 is to print ink selectively on top of the unitary structure, so that only the uppermost portions of the imagery elements are covered with ink. Such an arrangement is depicted by the unitary structure 30 shown in FIG. 3 where the micro-imagery elements, such as the "A" micro-imagery element 32, protrude from the micro lenses, such as the micro-lens 34, and in which the upper surface of the micro-imagery elements, including that of the micro-imagery element 32, is coated with ink.

FIG. 4 depicts a simulation 40 which shows how the corresponding magnified image looks like in reflected light. The magnified image contrast is considerably greater compared to the contrast of the simulation 20 shown in FIG. 2 since the image formation is achieved by the coloured ink of the "A" micro-imagery element absorbing the light and causing a greater change to the brightness of the light directed by the lens to the observer.

Whilst this solution is effective, it can offer challenges in practice, since application of the ink selectively to the upper surfaces of the imagery structures, without also applying ink to the immediately adjacent lens surfaces, requires very precise mechanical tolerance in printing apparatus.

For example, verified control is required of the pressure between the ink application tool, typically a flexo plate mounted on a roller, and the unitary structure. Small deviations in pressure that are still within the tolerances of typical printing equipment can result in deviations in the volume of ink applied per unit print area, that cause ink to be printed on top of the immediately adjacent lens surfaces as well as on top of the imagery structures, thereby causing defects and/or distortions in the magnified image. Ensuring sufficiently uniform pressure requires high geometrical precision, high trueness and low eccentricity in the anilox (ink application) roller, and in the plate roller on which the flexo plate is mounted, as well as in the impression roller for supporting the unitary structure substrate.

Also, to further ensure sufficiently uniform pressure, the flexo plates themselves must be very uniform in thickness and in hardness to ensure minimal dot gain and consistent ink thickness application.

The flexo plate mounting tape must also have consistent thickness and hardness/density, and must be consistently applied ensuring no air bubbles are trapped between the plate cylinder and mounting tape and between the mounting tape and flexo plate.

To achieve acceptable results, very fine metering of ink from the anilox roller to the flexo plate is required. The imagery structures are very small, assuming they are used as security features on bank notes, therefore only a very thin layer of ink can be accommodated by the imagery structures if the ink is to be applied only to the tops of the imagery structures. To achieve this, the anilox roller must be engraved with extremely fine cells. The volume per anilox roller cell required is very small and such cells can be difficult to make with consistent volumes. The anilox cells will typically have a broad distribution of volumes, and invariably some cells and some areas of the roller will have volumes that are too high or too low, causing undesirable deviations in the volume of ink applied per unit area, again leading to ink defects and/or distortions in parts of the magnified image.

Overall, there are many parameters in the ink application process and small deviations in any of them, that are within the tolerance of the print process, in this example flexographic, can result in issues in consistently applying the thin layer of ink required to selectively coat the tops of the protruding imagery structures. This can result in unacceptably high spoilage and make such security features very expensive to manufacture.

Accordingly, a more robust manufacturing process is required for micro-optic devices that produce a magnified image including a unitary structure having focusing elements and imagery elements with improved image contrast in the magnified image. It would be desirable to provide an improved process for manufacturing such a micro-optic device which can operate within normal manufacturing process tolerances, enabling lower spoilage and making production of these features more economical. It would also be desirable to provide a micro-optic device including focusing elements and corresponding imagery elements integrated into a unitary structure that ameliorates or overcomes one or more disadvantages or inconveniences of known micro-optic devices.

Any reference to or discussion of any document, act or item of knowledge in this specification is included solely for the purpose of providing a context for the present invention. It is not suggested or represented that any of these matters or any combination thereof formed at the priority date part of the common general knowledge, or was known to be relevant to an attempt to solve any problem with which this specification is concerned.

SUMMARY OF INVENTION

In a first aspect, the present invention provides a micro-optic device for producing a magnified image, including: a first unitary structure on one side of a substrate, the first unitary structure including a first group of focusing elements and a first group of imagery elements, wherein one of the first group of focusing elements and the first group of imagery elements is recessed with respect to the other, wherein the device further includes a first coating of ink overprinted on the first unitary structure, to at least partially fill the recessed group of elements, and wherein a property of the ink provides a visual contrast in the magnified image.

In one embodiment, the first coating of ink forms an integral component of the magnified image.

In one embodiment, the first coating of ink is overprinted on the first unitary structure in areas that do not contain structures forming the imagery elements, such as on the focusing elements or along boundaries between adjacent focusing elements.

In one embodiment, the property of the ink providing a visual contrast is a refractive index of the ink, which is different to refractive index of the unitary structure, and/or a colour of the ink.

In one embodiment, the ink is at least partially transparent or translucent, or partially opaque, and/or tinted with colour.

In one embodiment, the micro-optic device includes a second overprinted coating of ink, the first and second overprinted coatings of ink having different colours that provide different visual contrasts in the magnified image.

In one embodiment, the first and second overprinted coatings are in the regions that overlap.

In one embodiment, the imagery elements are recessed into a surface of the focusing elements, to form voids or grooves in the surface of the focusing elements, and/or the focusing elements are recessed with respect to the imagery elements.

In one embodiment, the first coating of ink is applied so as to completely cover the first unitary structure and have a planar outer surface.

In one embodiment, the micro-optic device further includes an additional coating having a refractive index different to the first unitary structure, wherein the additional coating is applied so as to completely cover the first unitary structure and have a planar outer surface.

In one embodiment, the imagery elements are positioned so that the focusing elements focus or sample the imagery elements via light internally reflected within the substrate.

In one embodiment, the first coating of ink overprinted on the first unitary structure is applied at a pressure and loading sufficient to at least partially fill the recessed group of elements.

In one embodiment, the imagery elements are formed in a selected surface region of the focusing elements, including: a centre region of the focusing elements, an annular region of the focusing elements, a cross-shaped region of the focusing elements, or any random surface regions of the focusing elements.

In one embodiment, one or more of the focusing elements are flattened, such that a substantially flat surface is formed in these focusing elements, and at least some of the imagery elements are formed in the substantially flat surfaces of the one or more focusing elements.

In one embodiment, one or more of the focusing elements are partially flattened, such that a substantially flat surface is formed in each of the one or more focusing elements, and at least some of the imagery elements are formed in the substantially flat surfaces of the focusing elements.

In one embodiment, the one or more focusing elements are partially flattened in an edge portion of the focusing elements, such that a contiguous flat portion is formed in two adjacent focusing elements.

In one embodiment, the flat surface is parallel to a plane of the substrate.

In a second aspect, the present invention provides a method of manufacturing a micro-optic device for producing a magnified image according to any one of the preceding claims, including the steps of: forming a first unitary structure on one side of the substrate, the first unitary structure including a first group of focusing elements and a first group of imagery elements, wherein one of the first group of focusing elements and the first group of imagery elements is recessed with respect to the other; and overprinting a first coating of ink on the first unitary structure, at a loading and pressure sufficient to at least partially fill the recessed group of elements, wherein a property of the ink provides a visual contrast in the magnified image.

In one embodiment, the first coating of ink is overprinted on the first unitary structure in areas that do not contain imagery structures, such as on focusing elements or along boundaries between adjacent focusing elements.

In one embodiment, the property of the ink providing the visual contrast is a refractive index of the ink, which is different to the unitary structure, and/or a colour of the ink.

In one embodiment, the ink is at least partially transparent or translucent, or partially opaque, and/or tinted with colour.

In one embodiment, the method further comprising a step of overprinting a second coating of ink, the first and second overprinted coatings having different colours that provide different visual contrasts in the magnified image, wherein the first and second overprinted coatings at least partially overlap.

In one embodiment, the first coating of ink is applied so as to completely cover the first unitary structure to form a planar outer surface.

Definitions

Security Document or Token

As used herein, the terms security documents and tokens includes all types of documents and tokens of value and identification documents including, but not limited to the following: items of currency such as bank notes and coins, credit cards, cheques, passports, identity cards, securities and share certificates, driver's licences, deeds of title, travel documents such as airline and train tickets, entrance cards and tickets, birth, death and marriage certificates, and academic transcripts.

The invention is particularly, but not exclusively, applicable to security documents or tokens such as bank notes or identification documents such as Identity cards or passports formed from a substrate to which one or more layers of printing are applied.

Security Device or Feature

As used herein, the term security device or feature includes any one of a large number of security devices, elements or features intending to protect security document or token from counterfeiting, copying, alteration or tampering. Security devices or features may be provided in or on the substrate of the security document or in or on one or more layers applied to the base substrate, and may take a wide variety of forms such as security threads embedded in layers of the security document; security inks such as fluorescent, luminescent or phosphorescent inks, metallic inks, iridescent inks, photochromic, thermochromic, hydrochromic, or peizochromic inks; printed or embossed features including release structures; interference layers; liquid crystal devices; lenses and lenticular structures; optically variable devices (OVDs) such as diffractive devices including diffraction gradients, holograms and diffractive optical elements (DOEs).

Substrate

As used herein, the term substrate refers to the base material from which the security document or token is formed. The base material may be paper or other fibrous materials such as cellulous; a plastic or polymeric material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials.

The use of plastic or polymeric materials in the manufacture of security documents pioneered in Australia has been very successful because polymeric banknotes are more durable than their paper counterparts and can also incorporate new security features (such as micro-optic devices).

In preferred embodiments, the substrate is a transparent or translucent material. Transparent substrates are particularly preferred as micro-imagery elements produced on one surface of the substrate may then be viewed through an array of focusing elements disposed on the opposite surface of the substrate. The thickness of the transparent substrate is preferably above 25 µm, to allow the micro-imagery elements to be placed at, or just within, the focal length of focusing elements on the opposite surface. In some embodiments, the substrate is from 60 to 100 µm thick, preferably from 65 to 90 µm thick.

A particularly suitable transparent substrate is polypropylene and in particular bi-axially oriented polypropylene.

Transparent Windows and Half Windows

As used herein, the term window refers to a transparent or translucent area in the security document compared to the opaque region to which printing is applied. The window may be fully transparent so as to allow the transmission of light substantially unaffected, or it may be partly transparent or translucent, partly allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting at least one opacifying layer in the region forming the window area. If opacifying layers are applied to both sides of a transparent substrate, a fully transparent window may be formed by omitting the opacifying layers on both sides of the transparent substrate in the window area.

A partly transparent or translucent area herein after referred to as a "half-window", may be formed in a polymeric security document which has opacifying layers on both sides by omitting the opacifying layers on one side only of the security document in the window area so that "half-window" is not fully transparent but allows sunlight to pass through without allowing objects to be viewed clearly through the half-window.

Alternatively, it is possible for the substrates to be formed from a substantially opaque material, such as paper or fibrous material, without an insert of transparent plastics material inserted into a cut out or recessed into the paper or fibrous substrate to form a transparent window or a translucent half-window area.

Opacifying Layers

One or more opacifying layers may be applied to a transparent substrate to increase the opacity of the security document. An opacifying layer is such that $L_T<L_0$ where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Focusing Elements

The plurality of focusing elements may include any devices previously reported to be suitable for viewing micro-imagery elements on a substrate, particularly a substrate of a security document. In some embodiments, the focusing elements comprise refractive micro-lens structures, including conventional micro-lenses and Fresnel lenses. In other embodiments, diffractive focusing elements, such as zone plates or photon sieves, may be employed. Fresnel lenses and diffractive focusing elements may be particularly suited for integration into a security feature of a security document, because such focusing elements are thinner than conventional micro-lens structures for a given focal length.

The plurality of focusing elements are generally in an ordered, repeating array, such as rectangular or hexagonal configurations. The focusing elements may be registered in exact or offset alignment with the array of micro-imagery elements on the substrate, depending on the nature of the optical effect to be produced.

BRIEF DESCRIPTION OF DRAWINGS

Preferred embodiments of the invention will now described by way of example with reference to the accompanying drawings in which.

DETAILED DESCRIPTION

Figure 1:
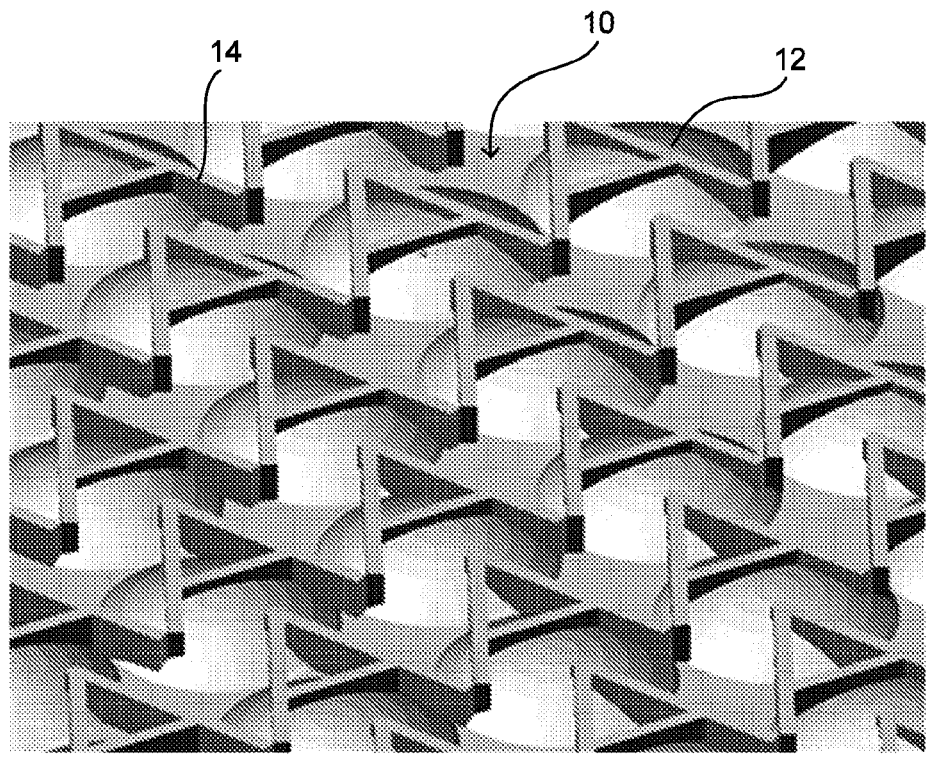
FIG. 1 is an isometric view of prior art unitary imaging structure forming part of a micro-optic device for producing a magnified image.
Figure 2:
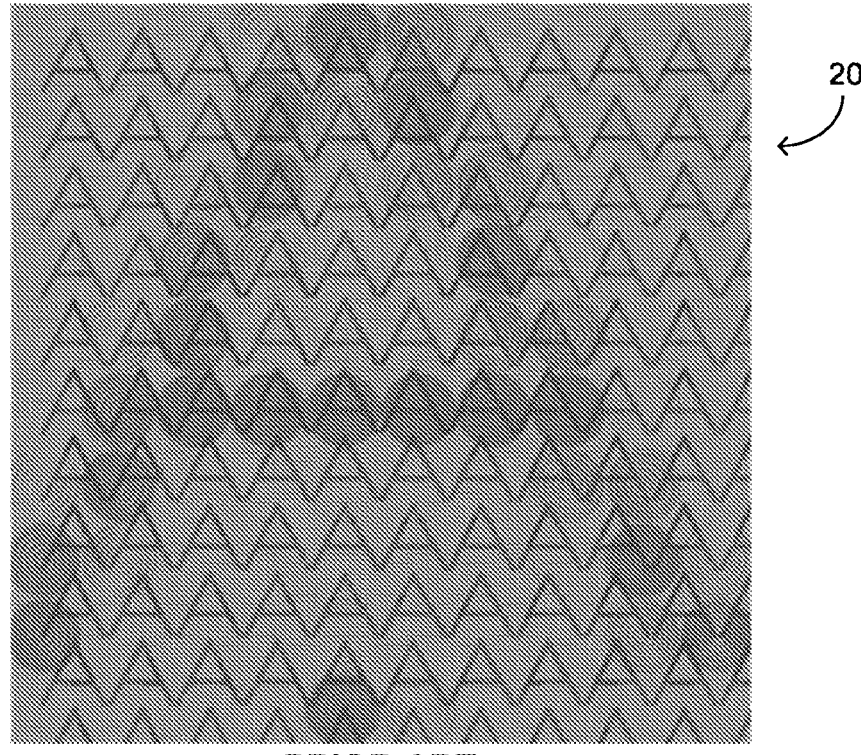
FIG. 2 is a plan view of a simulated magnified image produced by the imagery structure shown in FIG. 1.
Figure 3:
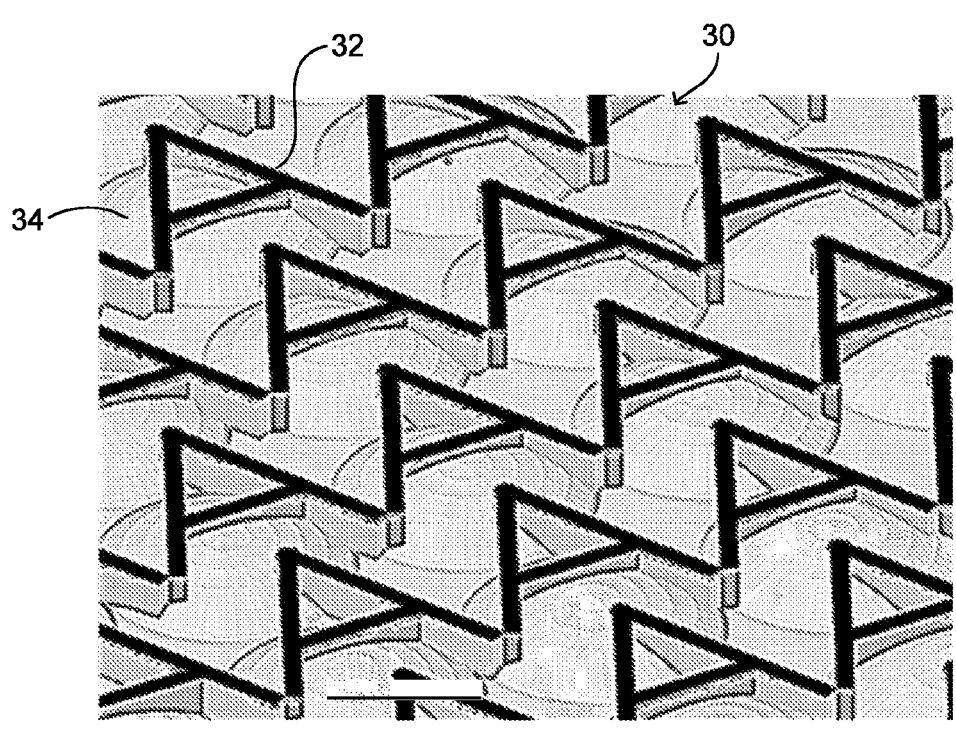
FIG. 3 is a isometric view of a unitary structure including a layer of ink coated onto the outer surfaces of the imagery elements projecting from the focusing elements in the unitary structure, the unitary structure forming part of a known micro-optic device for producing a magnified image.
Figure 4:
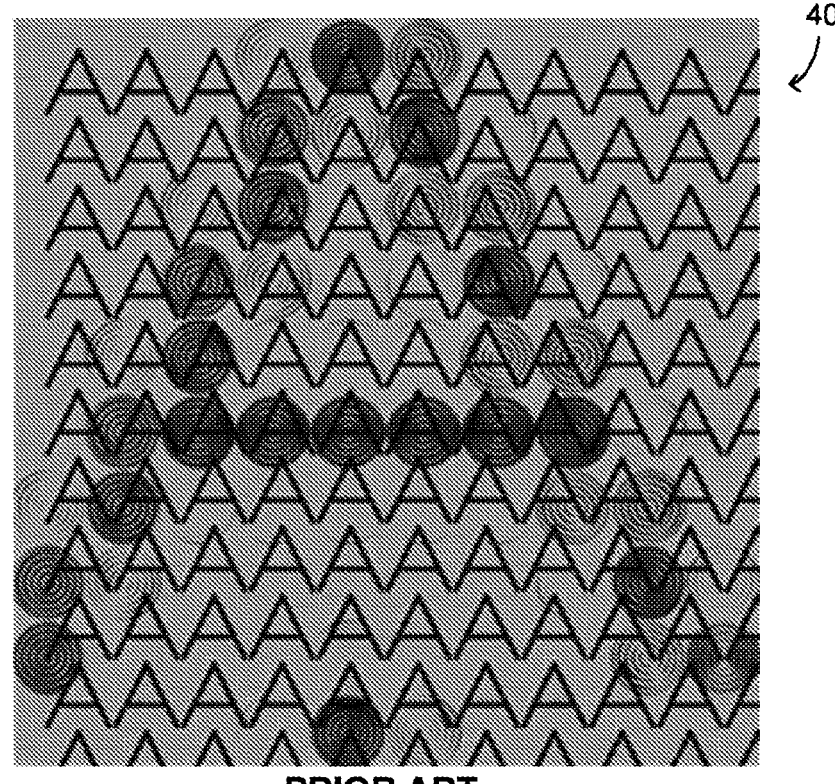
FIG. 4 is a plan view of a simulation of the magnified image produced by the unitary structure shown in FIG. 3.
Figure 5:
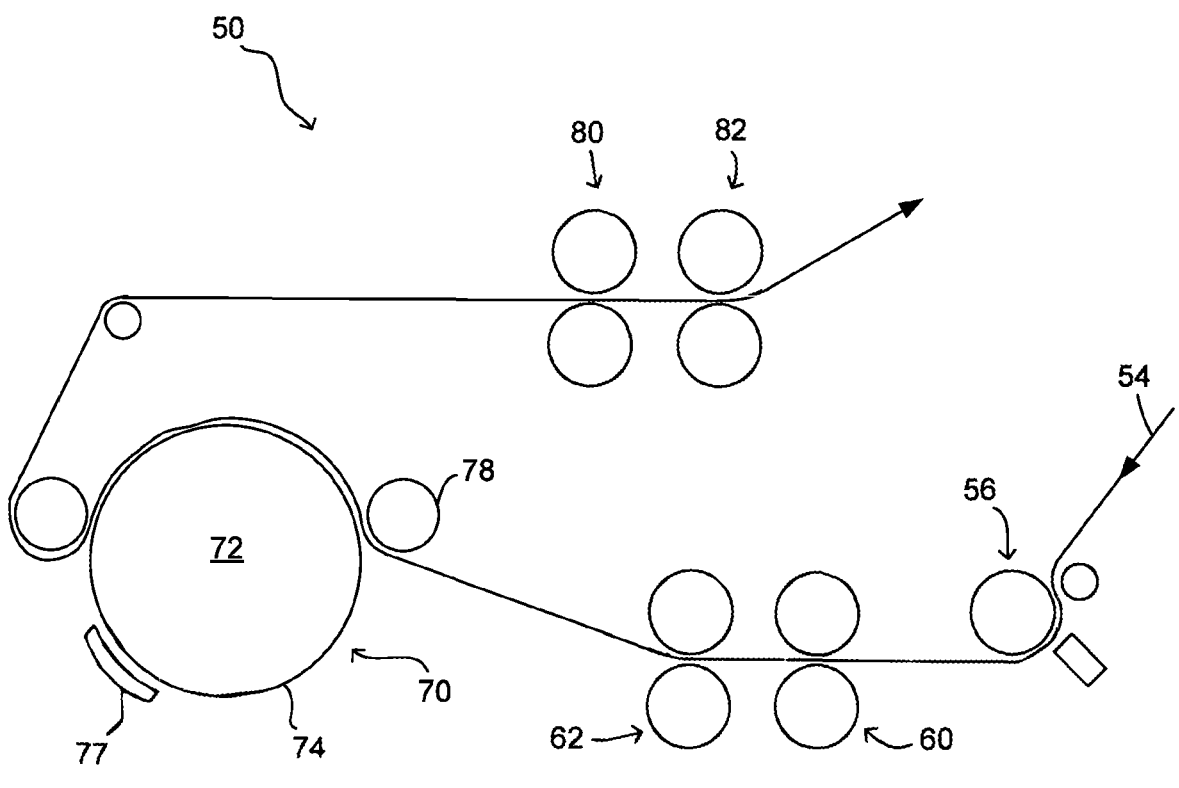
FIG. 5 is a schematic diagram of one embodiment of an apparatus for in-line manufacturing part of a security document including a micro-optic device for producing a magnified image in accordance with one or more embodiments of the present invention.
Figure 6:
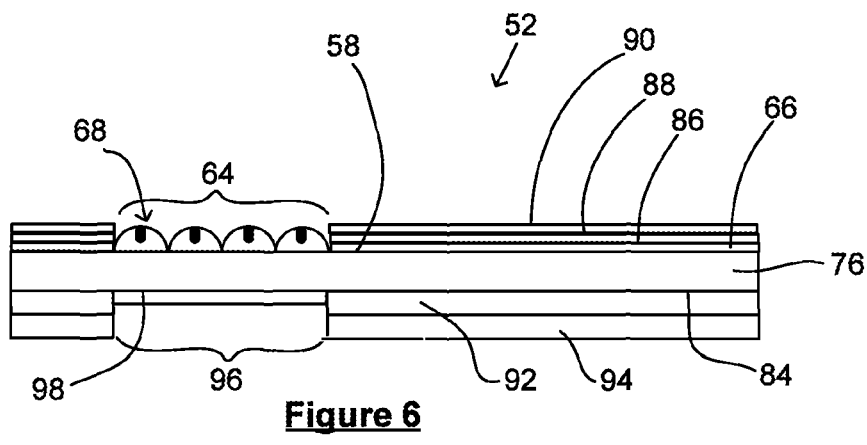
FIGS. 6 and 7 are cutaway side views of different embodiments of a partially manufactured security document manufactured by the apparatus of FIG. 5.

FIG. 5 shows an exemplary apparatus 50 for in-line manufacturing part of an exemplary security document 52 shown in FIG. 6. A continuous web 54 that is translucent or transparent material such as polypropylene or PET is subject to an adhesion promoting process a first process station 56 including a roller assembly. Suitable adhesion promoting processes include flame treatment, corona discharge treatment, plasma treatment or similar.

An adhesion promoting layer 58 is applied at a second processing station 60 including a roller assembly. A suitable adhesion promoting layer is one specifically adapted for the promotion of an adhesion of UV-curable coatings to polymeric surfaces. The adhesion promoting layer may have a UV-curable layer, a solvent-based layer, a water-based layer or any combination of these.

At a third processing station 62 which also includes a roller assembly a radiation sensitive coating is supplied to the surface of the adhesion promoting layer 58. The radiation sensitive coating can be applied via flexographic printing, gravure printing or a silk screen printing process and variations thereof among other printing processes.

The radiation sensitive coating is only applied to a security element area 64 on a first surface 66 where a unitary structure 68 including a first group of focusing elements and a first group of imagery elements is positioned. The security element area 64 can take any form of a stripe, a discrete patch in the form of a simple geometric shape or in the form of a more complex graphical design.

While the radiation sensitive coating is still at least partially liquid, this is processed to form the unitary structure 68 at a fourth processing station 70. In one embodiment, the processing station 70 includes an embossing roller 72 for embossing the unitary structure 68 into a radiation sensitive coating in the form of a UV-curable ink. The embossing roller 72 has a cylindrical embossing surface 74 including surface relief formations corresponding to the shape of the unitary structure 68 to be formed. The surface relief formations can be designed so that the apparatus 50 is configured to form micro lenses and micro imagery elements in a variety of shapes.

In one particularly preferred embodiment, the radiation sensitive coating is formed from a radiation sensitive coating comprising an acrylic based UV-curable clear embossable lacquer. Such UV curable lacquers can be obtained from various manufacturers, including Kingfisher Ink Limited, product ultraviolet type UVF-203 or similar. These coatings have been reported to be particularly suitable for embossing microstructures, including diffractive structures such as DOEs, diffraction gratings and holograms, microlenses and lens arrays, and non-diffractive optically variable devices. Alternatively, the radiation curable embossable coating may be based on other compounds, e.g. nitro-cellulose.

In some embodiments, the radiation sensitive coating, when applied to the substrate, has a viscosity falling in the range of from about 20 to about 175 centipoise, and more preferably from about 30 to about 150 centipoise. The viscosity may be determined by measuring the time to drain the lacquer from a Zahn Cup #2. A sample which drains in 20 seconds has a viscosity of 30 centipoise, and a sample which drains in 63 seconds has a viscosity of 150 centipoise. Viscosities in this range may allow the coating to be applied by roll-to-roll gravure printing techniques.

The cylindrical embossing surface 74 of the embossing roller 72 may have a repeating pattern of surface relief formations or the relief structure formations may be localised to individual shapes corresponding to the shape of the security elements area 64 on the substrate 76 of the security document to be manufactured by the apparatus. The embossing roller 72 may have the surface relief formations formed by a diamond stylus of appropriate cross-section, or by direct laser engraving or chemical etching, or the surface relief formations may be provided by at least one embossing shim 77 provided on the embossing roller 72. The embossing shim may be attached by an adhesive tape, magnetic tape, clamps or other appropriate mounting techniques.

The UV-curable ink on the substrate 76 is brought into intimate contact with the cylindrical embossing surface 74 of the embossing roller 72 by a UV roller 78 at the processing station 70 such that the liquid UV-curable ink flows into the surface relief formations of the cylindrical embossing surface 74. At this stage, the UV-curable ink is exposed to UV radiation, for example, by transmission through the substrate layer 76.

With the unitary structure 68 applied to the security document substrate 76, one or more additional layers are applied at a downstream processing station including further roller assemblies 80 and 82. The additional layers may be clear or pigmented coatings and applied as a partial coating, as a continuous coating or a combination of both. In one preferred method, the additional layers are opacifying layers which are applied to one or both surfaces of the substrate 76 except in the region of the security element area 64.

FIG. 6 shows a partially manufactured security document formed with an embossed unitary structure 68 including a first group of focusing elements and a first group of imagery elements formed in the unitary structure. This security document comprises a transparent substrate of polymeric material preferably a bi-axially orientated polypropylene (BOPP) having a first surface 66 and a second surface 84. Opacifying layers 86, 88 and 90 are applied to the first surface 66 of the substrate, except in the security element area 64. The opacifying layers 92 and 94 are applied to the second surface 84 except in a window area 96 formed on an opposite side of the substrate to the unitary structure 68. A reflective layer 98 of material is applied in the window area 96.

In the exemplary security document 52 shown in FIG. 6, the imagery elements forming part of the unitary structure 68 are positioned so that the focusing elements focus or sample the imagery elements by light internally reflected within the substrate 76 from the reflective layer 98.

Figure 7:
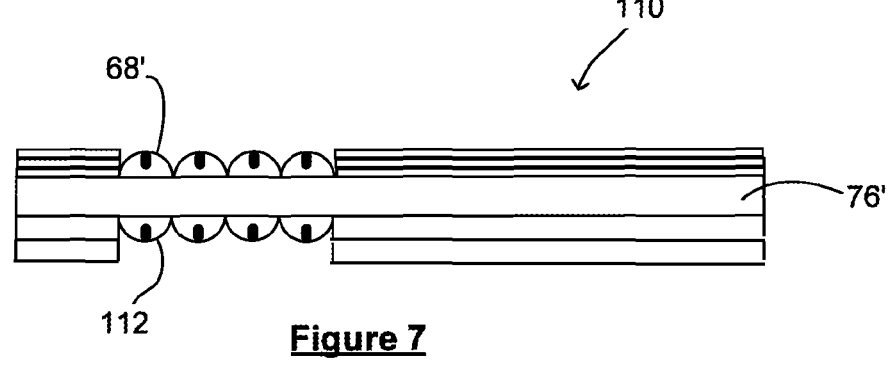

However, FIG. 7 depicts an alternative embodiment of a security document 110 identical in all respects to the security document 52, with the exception of that instead of a reflective layer 98 being formed in the window area 96, a second unitary structure 112 is formed on one side of the transparent substrate 76 opposite to that one which the first unitary structure 68' formed on the other side of the substrate 76. In this case, focusing elements on one side of the substrate 76 focus or sample imagery elements on the opposite side of the substrate 76.

Figure 8:
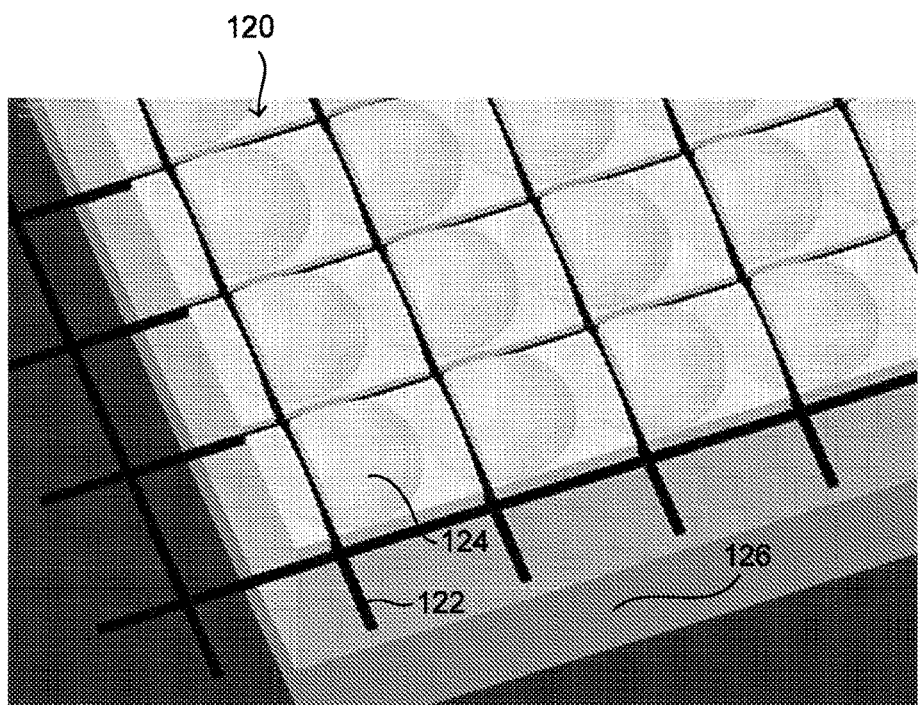
FIG. 8 is an isometric view of a unitary structure of focusing elements and imagery elements in accordance with one or more embodiments of the invention.

In the unitary structure 120 depicted in FIG. 8, imagery elements are recessed with respect to their adjacent focusing elements. Specifically, the imagery elements are recessed into the surface of focusing elements, to form voids or grooves in the surface of the focusing elements. Accordingly, an imagery element reference 122 is recessed with respect to focusing element 124 and at least a first coating of ink is overprinted on the first unitary structure, at a loading and pressure sufficient to at least partially fill the recessed group of imagery elements. In this case, the first coating of ink is at least one coating of coloured ink, which is preferably at least partially translucent and/or partially opaque.

By way of example, the at least one coating of coloured ink (and other inks described herein) may be solvent-based ink with solids content varying between 10% and 60%, depending on the desired printing viscosity. The viscosity of the ink may be in the range of from 16 to 25 seconds (10 to 50 centipoise) as measured using a Zahn Cup #2.

The first coating of ink (and other coatings described herein) may be formed by applying the ink at a mass loading of from about 1 g/m$^2$ to about 10 g/m$^2$, and at an impression pressure from about 0.5 bar to about 8 bar, using conventional printing techniques (such as roll-to-roll-Gravure printing). After application, the ink coating may be dried with heater ovens that blow warm air onto the substrate.

In one embodiment, adjacent focusing element portions are left uncoated.

Optionally, one or more further layers of the coloured ink can be applied, again at a loading and pressure sufficient to at least selectively and at least partially fill the recessed imagery elements, preferably leaving adjacent lens portions uncoated. As a result of the further coating application in the same ink colour, the recessed imagery elements have a further improved colour strength, which enhances the colour contrast in the magnified image.

Preferably, the recessed distance is greater than 1 micron and preferably less than 12 microns.

In other embodiments, multiple coatings may be applied to the unitary structure, optionally using the above mentioned method in regions that may or may not overlap. These multiple coatings may or may not be multi-coloured. Optionally, the single or multiple layers of coloured ink may form a part of a design or graphic. Part or whole of the design or graphic may include a part including magnified images produced by the unitary structures described herein, wherein the magnified images are optionally multi-coloured.

The contrast between the ink in the recessed imagery and the uncoated adjacent focusing elements provides a visual contrast in the magnified image produced by the unitary structure. In the unitary structure 120 depicted in FIG. 8, the focusing elements, provided in the form of micro lenses, including the referenced micro lens 124, are round and have a width of 75 microns, with a sag of 10 microns. The micro lenses are located on a rectangular grid having a grid pitch of 75 microns. The unitary structure 120 also includes recessed imagery elements, of the type reference 122, recessed to a depth of at least 10 microns in the form of a rectangular grid having a slightly different pitch to that of the micro lenses so as to implement a moiré magnification design of the grid pattern. In this example, the recessed imagery elements have been filled with black ink, which is at least partially translucent and/or at least partially opaque, by overprinting the unitary structure with a layer of the black ink using gravure printing, at an ink loading and a pressure sufficient to at least partially fill the recessed imagery elements. The adjacent lens portions are preferably left uncoated.

In this embodiment, a reflective layer is deposited or otherwise formed on an opposite side of a substrate to the side on which the unitary structure is formed. The total thickness of the unitary structure substrate and reflective coating is approximately 110 microns, or approximately half the focal length of the micro lenses.

Figure 9:
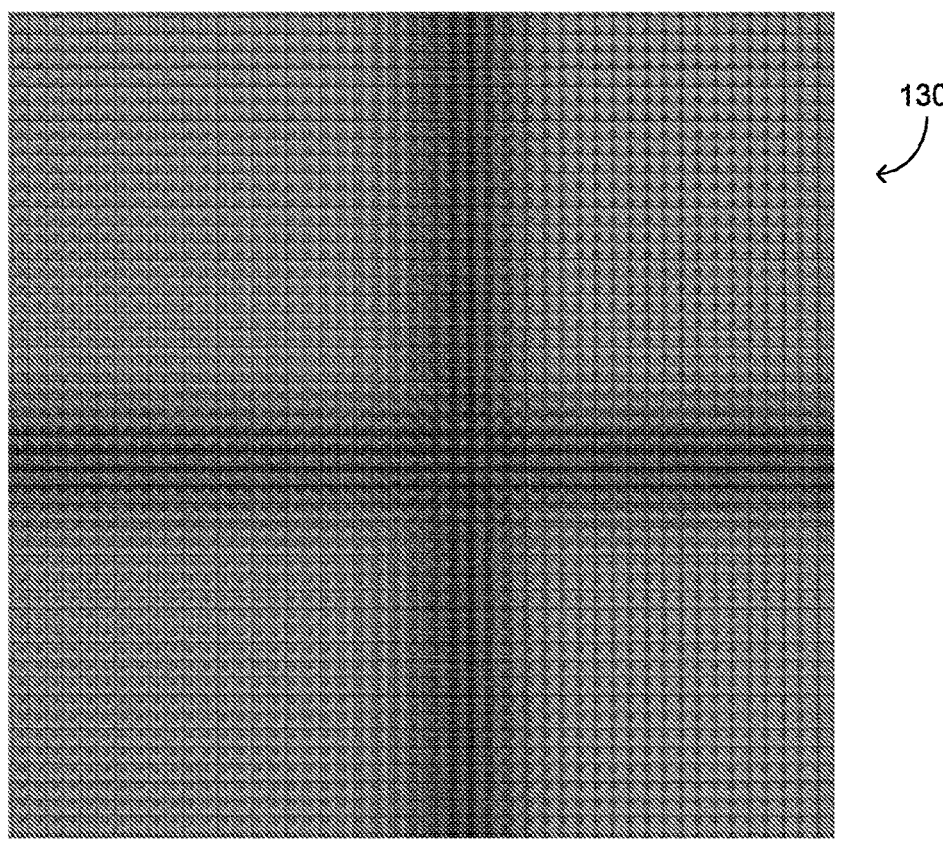
FIG. 9 is a plan view of a simulation of a magnified image produced by a micro-optic device including the imagery structure shown in FIG. 8.

In the example shown in FIG. 8, incident ambient light will be refracted by the focusing elements, such as the element reference 124, towards the reflective coating 126 and reflected therefrom, to focus on the black ink in the recessed imagery elements, resulting in a moiré magnified image of the grid being projected to the observer, as seen by the moiré magnified image 130 shown in FIG. 9. This Figure shows a plan view of the moiré magnified image at a viewing angle normal to the substrate the image shown in a plan view corresponding to a 3.75 mm×3.75 mm unitary structure.

The ink applied to the unitary structure 120 shown in FIG. 8 segregates upon application into surface portions that have the highest curvature and/or greatest local change in surface gradient. Accordingly, the ink will segregate depending on the surface curvature spatial distribution such that the ink thickness/ink area density after segregation will be greater in locations where the curvature or local change in surface gradient is greater.

The recessed imagery elements have the highest curvature and/or greatest local change in surface gradient, along with the perimeter of each micro lens element. This is the case, even for micro focusing elements arranged without gaps between them.

To ensure that the ink is primarily deposited into the recessed imagery elements and to ensure that minimal ink is deposited on top of the focusing elements, a lower ratio of lens sag to lens width is preferred, since this reduces the local change in surface gradient along the lens perimeter.

The ratio of sag to width can be reduced by selecting focusing elements with either lower sag, or with greater width. This means that the lens focal length must be increased. The trade-off is that a thicker substrate will be required, to ensure a sufficiently sharp focus is maintained on the recessed imagery elements. Depending on the imagery design that is used, an out of focus lens design may be acceptable and may assist in keeping the substrate thickness reduced.

Figure 10:
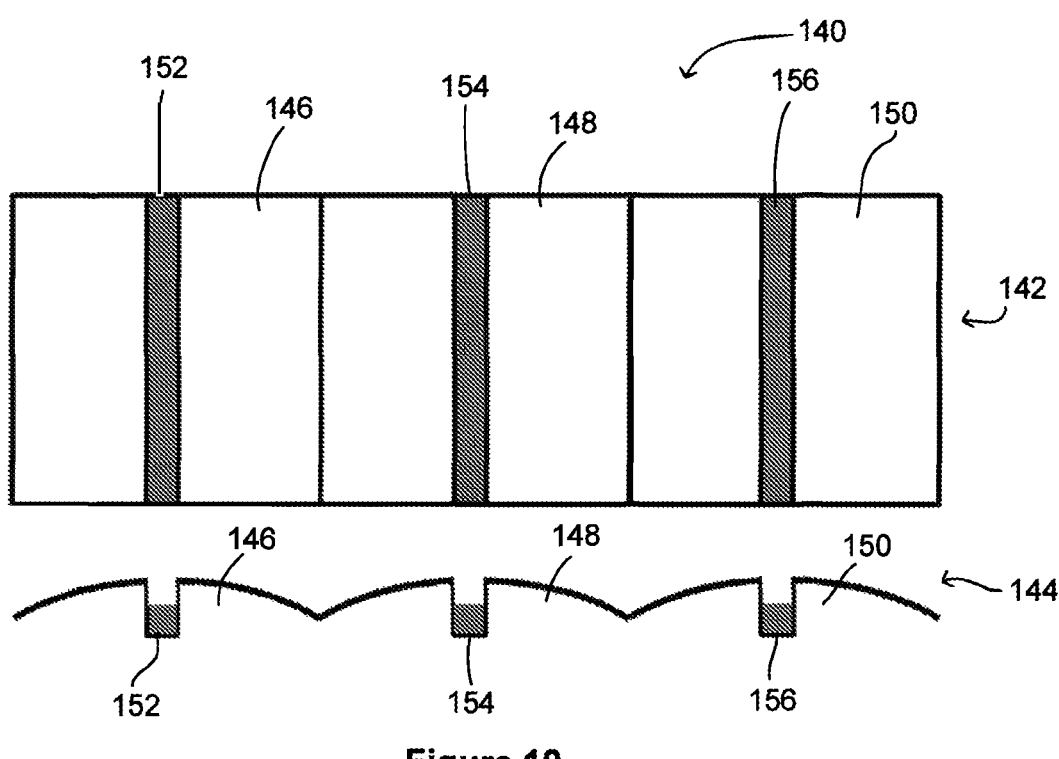
FIG. 10 is a schematic diagram depicting plan and side views of a imagery structure according to one or more embodiments of the present invention.

In the exemplary unitary structure depicted in FIG. 8, the ink is being deposited into the recessed imagery elements of the unitary structure 120. A schematic depiction 140 of a unitary structure (of the type in FIG. 8) is depicted in FIG. 10, which shows a plan view 142 and a side view 144 of the unitary structure 140. In this schematic depiction, the unitary structure includes focusing elements 146 to 150. Imagery elements 152 to 156 are shown as being recessed in the focusing elements 146 to 150, that is, the imagery elements 152 and 156 are recessed into the surface of the focusing elements 146 to 150, which is sufficient to cause a change in the surface curvature of the lens element 146 to 150, but still allowing the focusing elements 146 to 150 to perform their sampling functions. Coloured ink is deposited into each of the recessed imagery elements 152 to 156 in substantially equal amount. In the example shown in FIG. 10, the overprinted coating of ink has a thickness which is less than the recessed height of the imagery structures.

Figure 11:
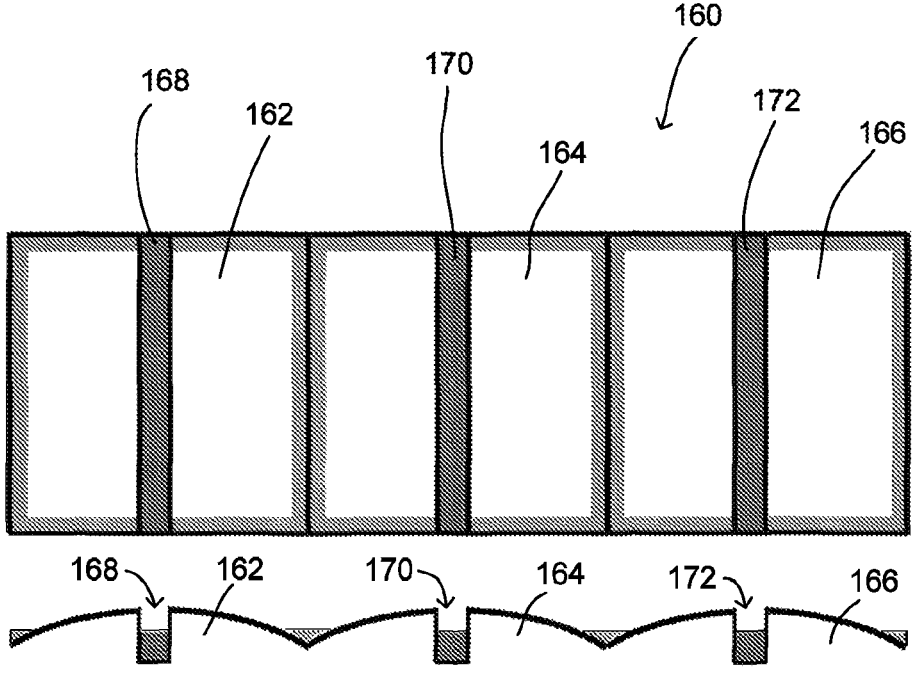
FIG. 11 is a schematic diagram depicting plan and side views of a variation to the unitary structure shown in FIG. 10.

However, in other embodiments, the overprinted coating of ink may also be deposited on the unitary structure in areas that do not contain imagery structures. For example, in the unitary structure 160 depicted in FIG. 11, some ink is additionally deposited along boundaries between adjacent focusing elements. The unitary structure 160 includes focusing elements 162 to 166 and imagery elements 168 to 172 recessed with respect to the focusing elements 162 to 166. As was the case with the unitary structure 140 depicted in FIG. 10, at least a first coating of coloured ink is overprinted on the unitary structure 160, at a loading and pressure sufficient to at least partially fill the recessed group of imagery elements. Some coloured ink is additionally deposited along the perimeter of each lens element structure. The unitary structure 160 can still produce projected images with sufficient contrast for document authentication, however the projected image contrast is further reduced compared to the image produced by the unitary structure 140. The reduction is approximately in accordance with the percentage of the non-recessed (lens) area that is coated with the coloured ink, in accordance with the thickness of the ink at these locations, relative to the thickness of the ink in the recessed (image) area.

The lens perimeter portions coated with ink are focused on/projected by the focusing elements to an observer at large viewing angles only (defined by the lens geometry and distance from the lens to reflective layer on an opposing side of the substrate on which the unitary structure is located). When viewing at such angles, the contrast in the projected image will be further reduced, since the projected image background will become darker, in accordance with the thickness of the ink deposited along the lens perimeter that is focused by the lens.

The embodiments described in the relations to FIGS. 8 to 11 all include a unitary structure having a group of focusing elements and a group of imagery elements, wherein the imagery elements are recessed with respect to the focusing elements and a first coating of coloured ink is overprinted at a loading and pressure sufficient to at least partially fill the recessed group of imagery elements. However, ink colour is only one example of a property of the overprinted ink that enables a visual contrast to be present in the magnified image produced by the micro-optic device. In the various embodiments depicted in FIGS. 12 to 17, rather than using a coloured ink that is at least partially translucent and/or at least partially opaque, an ink that is at least partially transparent and has a different refractive index to the unitary structure is used. In these embodiments, the differing refractive index of the ink compared to the unitary structure is the property of the ink that provides the visual contrast in the magnified image.

Figures 12, 13, 14:
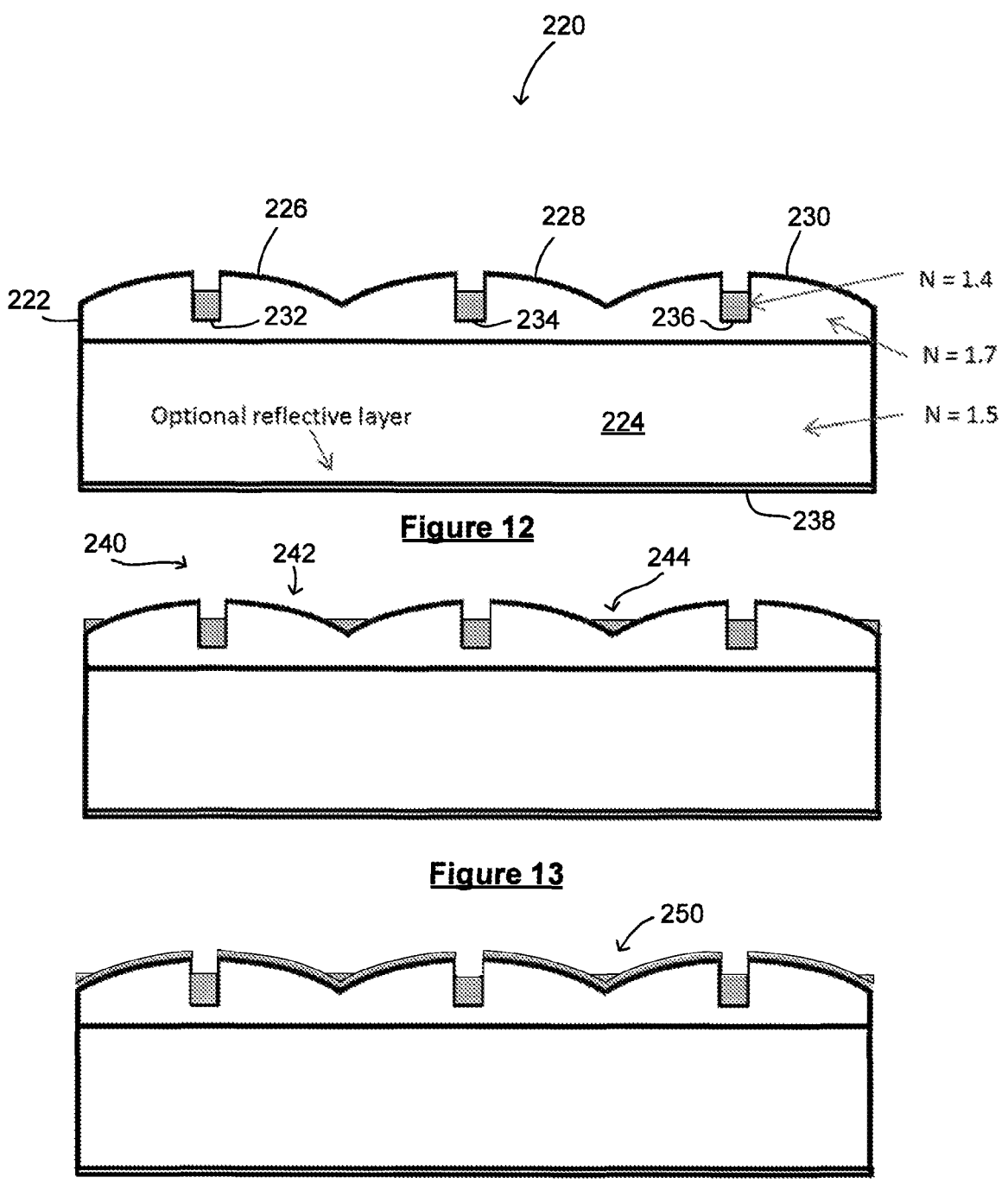
FIGS. 12, 13 and 14 are side view of 3 embodiments of a micro-optic device, each respectively depicting an alternative to the micro-optic devices shown in FIGS. 10 to 12.

FIG. 12 depicts a micro-optic device 220 including a unitary structure 222 formed over a transparent substrate 224. A reflective layer 238 of material, such as silver ink, is formed on the opposite side of the substrate 224 to the side on which the unitary structure 222 is formed. The unitary structure 222 includes three exemplary focusing elements 226 to 230. Recessed imagery elements 232 to 236 are formed in the unitary structure as well. In this arrangement, a transparent ink is overprinted on the unitary structure 222 so that the recessed imagery elements 232 to 236 are at least partially filled with the transparent ink. The transparent ink has a different refractive index to that of the unitary structure 222. The difference in the refractive index between the at least partially filled recessed imagery elements and the unitary structure 222 causes changes in the brightness of light reflected back to an observer from the micro focusing elements 226 to 230, thus allowing the magnified image to be formed.

FIGS. 13 and 14 respectively depict micro-optic devices 240 and 250 identical to the micro-optic device 220 shown in FIG. 12, except that in FIG. 13 the transparent ink is overprinted so that in addition to at least partially filling the recessed imagery elements, ink is also deposited on the unitary structure 220 in areas that do not contain imagery structures, in this case along the boundaries 242 and 244 between adjacent focusing elements. Similarly, the micro-optic device 250 includes ink overprinted not only in the recessed imagery structures and along boundaries between adjacent focusing elements, but also on the focusing elements themselves.

Embodiments with not only partially filled imagery elements, but fully filled imagery elements are advantageous in some circumstances, since the imagery elements cannot be mechanically copied (via mechanical moulding) by a counterfeiter. A disadvantage though is that the projected image contrast is less when compared to other embodiments in which the overprinted ink is at least partially opaque and/or at least partially translucent.

In the exemplary embodiments depicted in FIGS. 12 to 14, the substrate of the micro-optic devices 220, 240 and 250 is transparent and has a refractive index of 1.5. The unitary structures of each of these micro-optic devices is transparent and has a refractive index of 1.7, whist the overprinted transparent layer has a refractive index of 1.4. The focusing are 100 microns wide, with a sag of 13 microns. The total thickness of the micro-optic device is approximately 100 microns.

In some embodiments, the at least partially transparent ink having a different refractive index to the unitary structure is overprinted to such an extent that the unitary structure is completely covered and coating of the ink has a planar outer surface. Such embodiments are particular advantageous because neither the focusing elements nor the imagery elements of the unitary structure can be mechanically copied (via mechanical moulding) by a counterfeiter. A disadvantage though is that the projected image contrast is less, compared to other embodiments in which the overprinted ink is at least partially opaque and/or at least partially transparent.

Whilst previously described embodiments have all included a unitary structure in which imagery elements are recessed with respect to adjacent focusing elements, in embodiments in which the ink is overprinted to completely fill the unitary structure, the imagery elements can be either recessed or protruding relative to the surface of the focusing elements of the unitary structure.

It is also possible to use concave refractive focusing elements, rather than convex focusing elements, if the overprinted layer has a refractive index sufficiently higher than the unitary structure.

Figures 15, 16, 17:
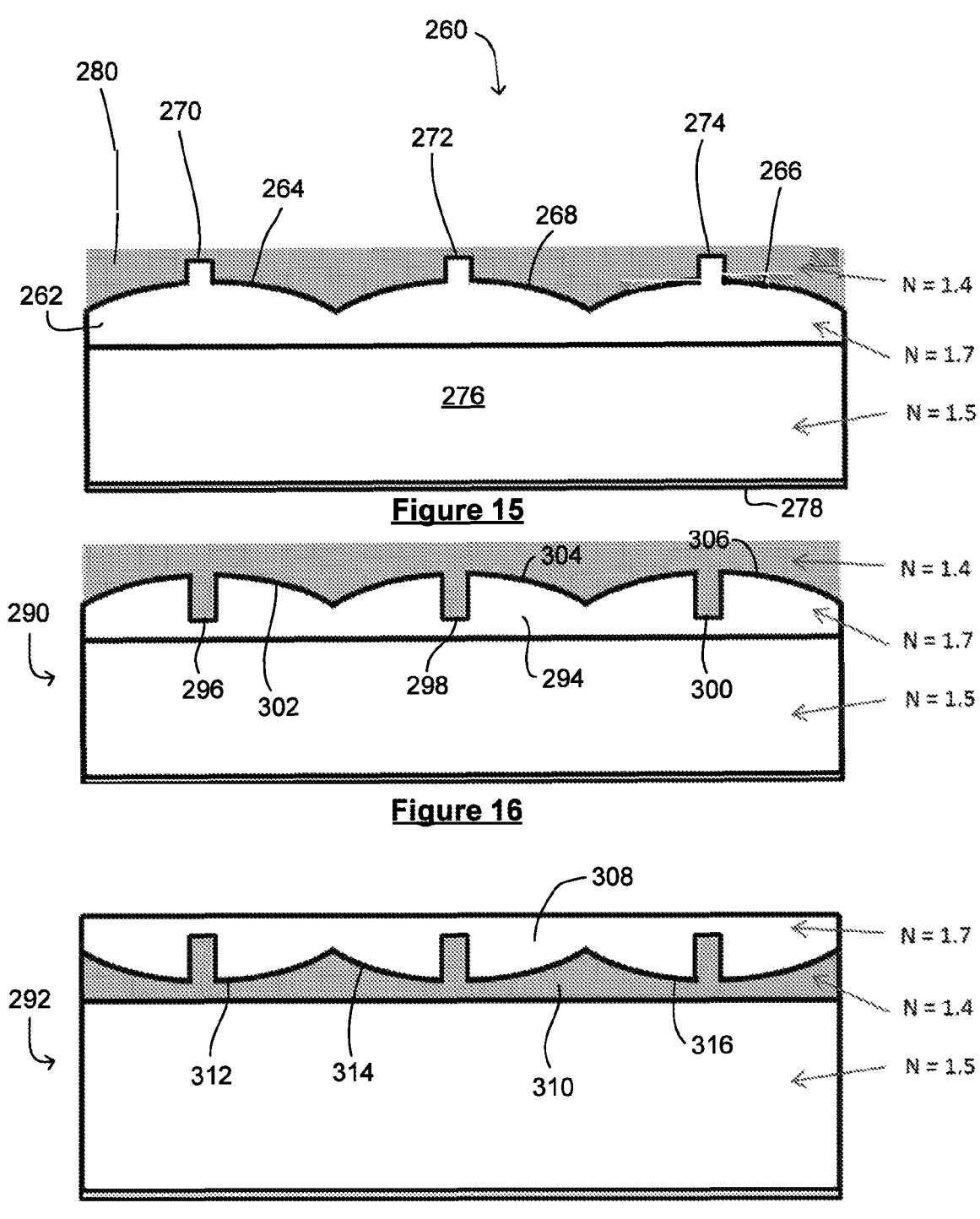
FIGS. 15, 16 and 17 depict 3 further embodiments of micro-optic devices including integrated structures in accordance with the present invention.

One exemplary embodiment is shown in FIG. 15. The micro-optic device 260 shown includes a unitary structure 262 having focusing elements 264 to 268 that are recessed with respect to the adjacent imagery elements 270 to 274. The unitary structure 262 is formed on one side of a transparent substrate 276. A reflective layer 278 of material is formed on an opposite side of the substrate 276. A coating 280 of ink having a different refractive index to the unitary structure 262 and being at least partially transparent is over-coated on the unitary structure 262 to completely cover the unitary structure. The ink is applied so as to have a planer outer surface.

In this exemplary arrangement, the refractive index of the substrate 276 is 1.5, the refractive index of the unitary structure 262 is 1.7 and the refractive index of the over-printed ink layer 280 is 1.4. The focusing elements 264 to 268 are convex reflective focusing elements. The focusing elements are 54 microns wide, having a sag of 10 microns, and the total device thickness is approximately 100 microns.

Optionally, either the substrate 276 or the unitary structure 262 or the overprinted transparent ink 280 may be tinted with a colour, to impart a colour to the magnified image.

The micro-optic devices 290 and 292 depicted respectively in FIGS. 16 and 17 are identical to the micro-optic device 260 shown in FIG. 15 except for the relative recessing of the imagery elements and the focusing elements and the shape of the focusing elements (concave or convex). In FIG. 16, the micro-optic device includes a unitary structure 294 in which the imagery elements 296 to 300 are recessed with respect to adjacent convex focusing elements 302 to 306. In the micro-optic device 292 shown in FIG. 17, the imagery elements are protruding relative to concave focusing elements 312 to 316, or in other words, the focusing elements 312 and 316 are recessed relative to the imagery elements.

The embodiments depicted in FIGS. 15, 16 and 17 can also be implemented with refractive Fresnel lenses or diffractive lenses.

In the embodiments depicted in FIGS. 12 to 17, the magnified image produced by the micro-optic device has a lower contrast than the magnified image produced by embodiments depicted in FIGS. 8 to 11, however the embodiments depicted in FIGS. 12 to 17 and in particular the embodiments depicted in FIGS. 15 to 17, are advantageous because the structure may be fully embedded within an overprinted layer thus making it very secure from the counterfeiting perspective, since both the lens and imagery structures cannot be copied via mechanical moulding.

Other embodiments of the invention combine the use of a coating of coloured ink described in relation to FIGS. 8 to 11, with the use of an at least partially transparent coating of ink having a different refractive index to the unitary structure as described in relation to FIGS. 15 to 17. One such exemplary embodiment shown in FIG. 18, in which a micro-optic device 320 is shown including a unitary structure 322 formed on a transparent substrate 324. A reflective layer 326 is formed on the opposite side of the substrate 324 to the side on which the unitary structure 322 is formed. Imagery elements 328 to 332 recessed with respect to adjacent focusing elements 334 to 338 form a unitary structure 322. A layer 340 of coloured ink that is at least partially translucent and/or at least partially opaque is overprinted on the unitary structure 322 at a loading and pressure sufficient to at least partially fill the recessed imagery elements 328 to 332 leaving at least some portions of the non-recessed convex (lens) surfaces 334 to 338 uncoated with the coloured ink.

Figures 18, 19:
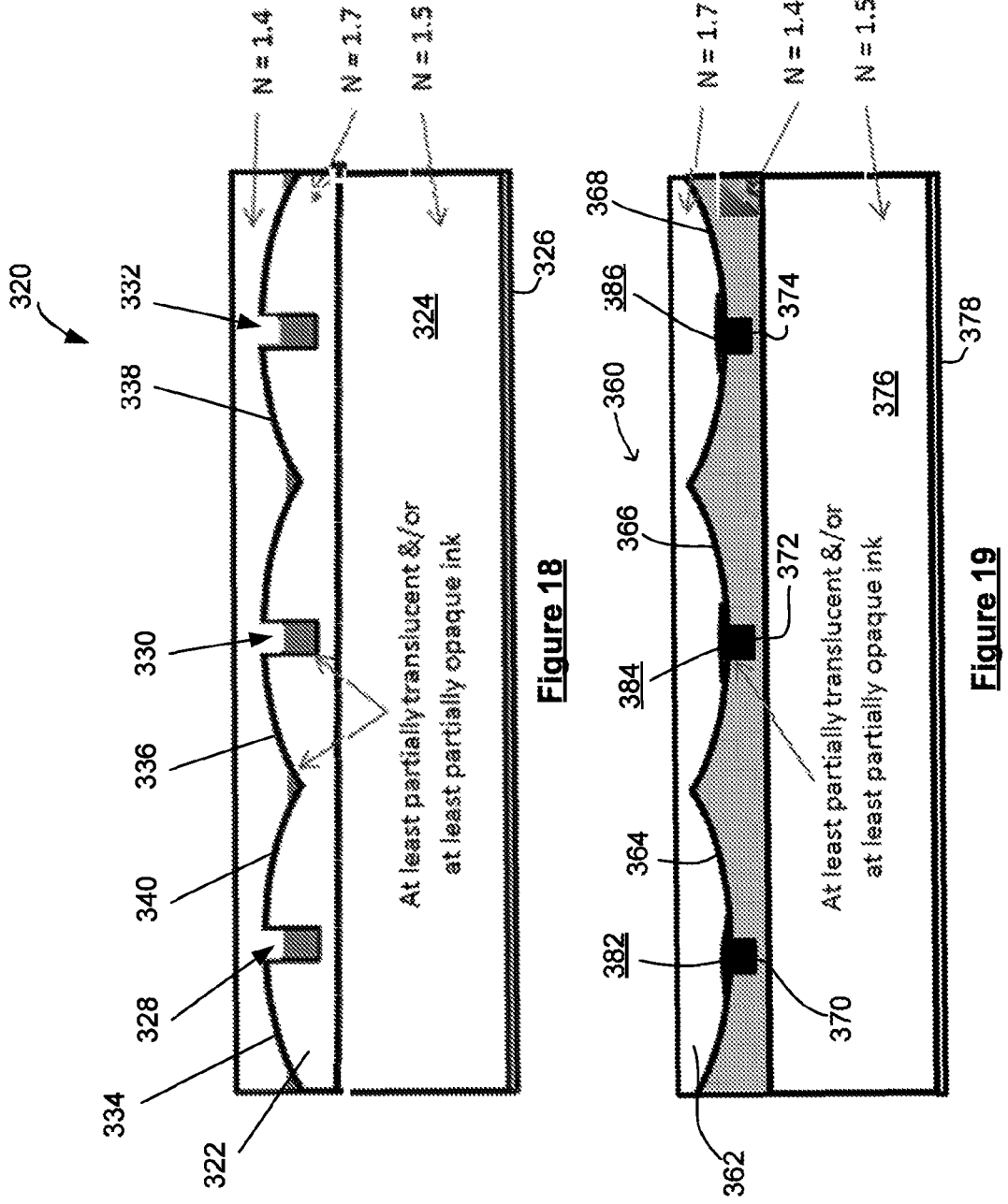
FIGS. 18 and 19 are side elevations of still further embodiments of a micro-optic device in accordance with the present inventions.

The micro-optic device 360 shown in FIG. 19 includes a unitary structure 380, substrate 376 and reflective layer 378 formed on an opposite side of the substrate to the unitary structure 380. In this embodiment, the unitary structure 380 consists of concave focusing elements 364 to 368 with imagery recesses 370 to 374. After formation of the unitary structure 380 via embossing, coloured ink 382 to 386 that is at least partially translucent &/or at least partially opaque is applied at a loading and pressure to at least partially fill the imagery recesses 370 to 374 in the unitary structure 380 leaving at least some portions of the concave lens surface uncoated. Finally, the unitary structure 380 and coloured ink 382 to 386 forming the imagery elements is overprinted with an at least partially transparent coating of ink, having higher refractive index than the unitary structure, wherein the overprinted ink volume per area applied is sufficient to result in a planar structure.

In these embodiments, at least partially translucent and/or at least partially opaque ink is applied to a unitary structure, and the structure is overprinted with a transparent ink having a different refractive index to the unitary structure, preferably so that the final structure has an exterior surface that is substantially planar. In the embodiments depicted, the lens width is 54 microns wide and has a sag of 10 microns, the total device thickness is approximately 100 microns.

If the unitary structure has convex focusing elements, the refractive index of the overprinted ink must be lower that the refractive index of the unitary structure, and if the focusing elements are concave then the overprinted ink refractive ink must be greater.

Previously described embodiments include a micro-optic device that is "single-sided", that is, wherein the imagery elements are positioned within a unitary structure so that adjacent focusing elements focus or sample the imagery elements by light internally reflected within the substrate on which the unitary elements are formed. In order to achieve this, the reflective layer is preferably located on an opposite side of the substrate to the unitary structure or within the substrate itself.

Figure 20:
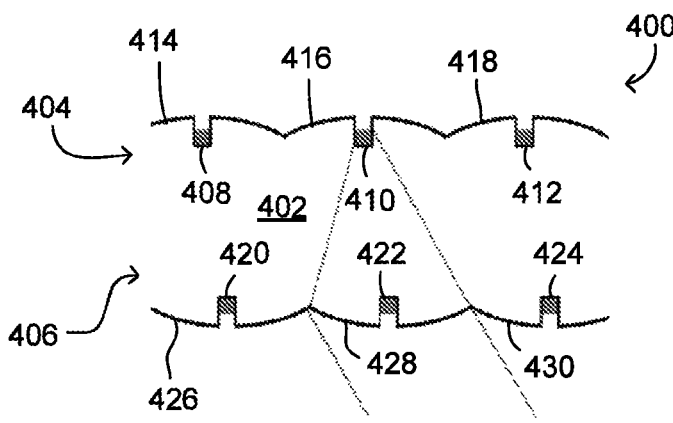
FIGS. 20 to 24 are side views of still further embodiments of a micro-optic device according to the present invention in which unitary structures including focusing elements and imagery elements are included on both sides of a transparent substrate, rather than on one side only as depicted in the embodiments shown in FIGS. 12 to 19.

However, in other embodiments the micro-optic device may be "double-sided", that is, include an at least partially transparent substrate on which unitary structures are formed on both sides. FIG. 20 depicts a micro-optic device 400 including a substrate 402 having unitary structures 404 and 406 formed on opposite sides of the substrate 402. The unitary structures 404 and 406 and the substrate 402 are made from materials having the same refractive index (in alternative embodiments they may have different refractive indices). At least a first coating of coloured ink (at least partially translucent &/or at least partially opaque) is overprinted on both unitary structures, at a load and pressure sufficient to at least partially fill the recessed imagery elements 408 to 412 of the first unitary structure 404, and to at least partially fill the recessed imagery elements 420 to 424 of the second unitary structure 406. In this embodiment, the focusing elements on one side of the substrate focus or sample imagery elements on the opposite side of the substrate 402.

Figure 21:
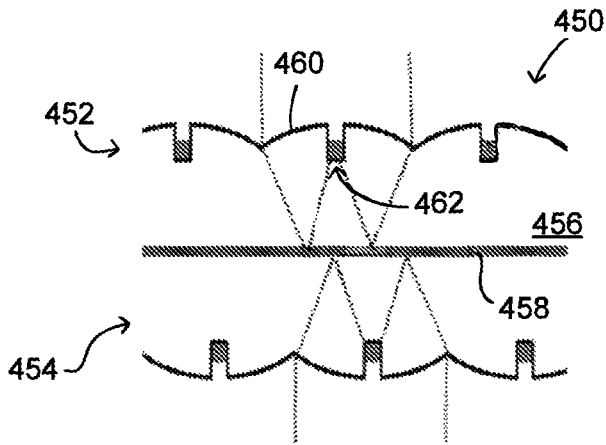

However, in the micro-optic device 450 shown in FIG. 21, whilst unitary structures 452 and 454 are formed on opposite sides of a substrate 456, a reflective layer 458 is formed within the substrate so that focusing elements focus or sample imagery elements within the same unitary structure via light internally reflected within the substrate. For example, the lens element 460 forming part of the unitary structure 452 focuses or samples light on the imagery elements 462 also forming part of the unitary structure 452 via light reflected internally from the reflective layer 458.

Figure 22:
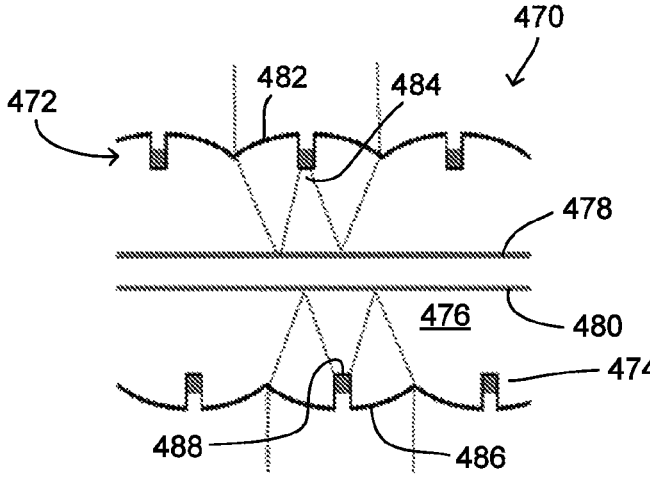

A further embodiment is depicted in FIG. 22, which shows a micro-optic device 470 having unitary structures 472 and 474 formed on opposite sides of a substrate 476. In this case, 2 reflective layers 478 and 480 are provided within the substrate 476 the first reflective layer 478 is located next to the imagery structure 472 so that focusing elements, such as the lens element 482 focuses or samples imagery elements, such as the image element 484 via light internally reflected within the substrate from the reflective layer 478. Similarly, the reflective layer 480 is located next to the unitary structure 474, and focusing elements, such as the lens element 486 focuses or samples imagery elements, such as the lens element 488 via light reflected internally within the substrate 476 from the reflective layer 480.

In the embodiments depicted in FIGS. 20 to 23, the first coating of ink is depicted as being deposited in the recessed imagery elements, however in other embodiments the overprinted ink may additionally be present along lens perimeters and/or be present on non-recessed lens surfaces (i.e. on surfaces not forming the recessed imagery elements).

Figure 23:
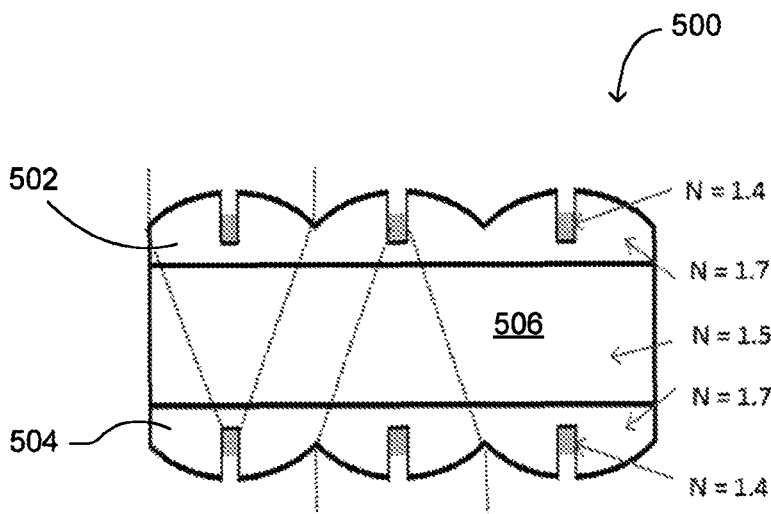
Figure 24:
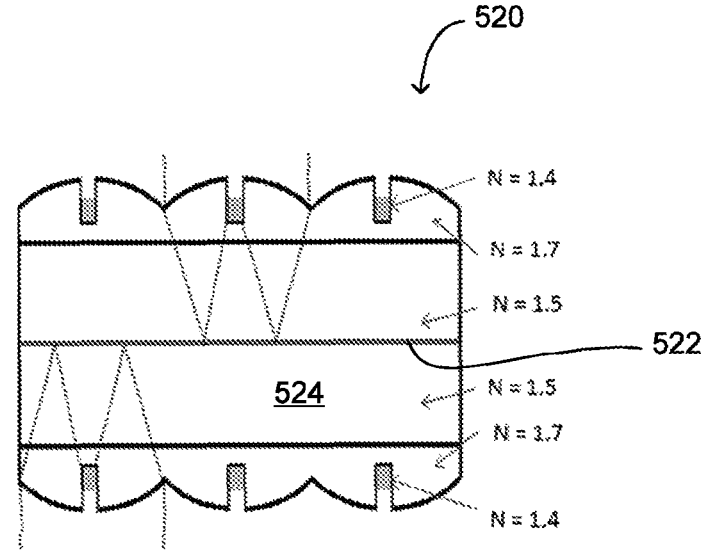

FIGS. 23 and 24 depict two different embodiments of double-sided micro-optic devices, in which unitary structures including focusing elements and imagery elements are present on both sides of the substrate. However, rather than the coating of ink depicted in FIGS. 23 to 25 being coloured, the property of the ink providing a visual contrast in the magnified image is the ink refractive index which is different to the refractive index of the unitary structure over which the ink is coated.

In the exemplary micro-optic device 500 depicted in FIG. 23, unitary structures 502 and 504 are formed on opposite sides of a substrate 506. Each unitary structure includes imagery elements that are recessed with respect to adjacent focusing elements. An overprinted coating of ink having a different refractive index to that of the respective unitary structure is applied, at a loading and pressure sufficient to at least partially fill the recessed imagery elements. In the micro-optic device 500, focusing elements on one side of the substrate focus or sample imagery elements on the opposite side of the substrate.

By comparison, the micro-optic device 520 depicted in FIG. 24 includes a reflecting layer 522 in the middle of the substrate 524 so that focusing elements on one side of the substrate focus and sample imagery elements on that same side via light internally reflected within the substrate from the reflecting layer 522.

In FIGS. 8 to 24 the imagery structures are depicted with vertical sidewalls, however embodiments of the invention with non-vertical side walls such as tapered side walls are also envisaged.

The contrast of the projected image produced by the micro-optic device can be further increased by allocating a selected region of the surface of each focusing element to be formed with imagery elements, and the remaining surface area of the focusing element to be void of imagery elements. By confining the imagery elements to a selected surface region of the focusing elements, the surface area of each focusing element which does not include any imagery elements is maintained, or increased (compared to embodiments in which imagery elements occupy a substantial surface area of the focusing elements), and therefore the contrast in the magnified image is increased due to increased focusing surface area of each focusing element.

Figure 25:
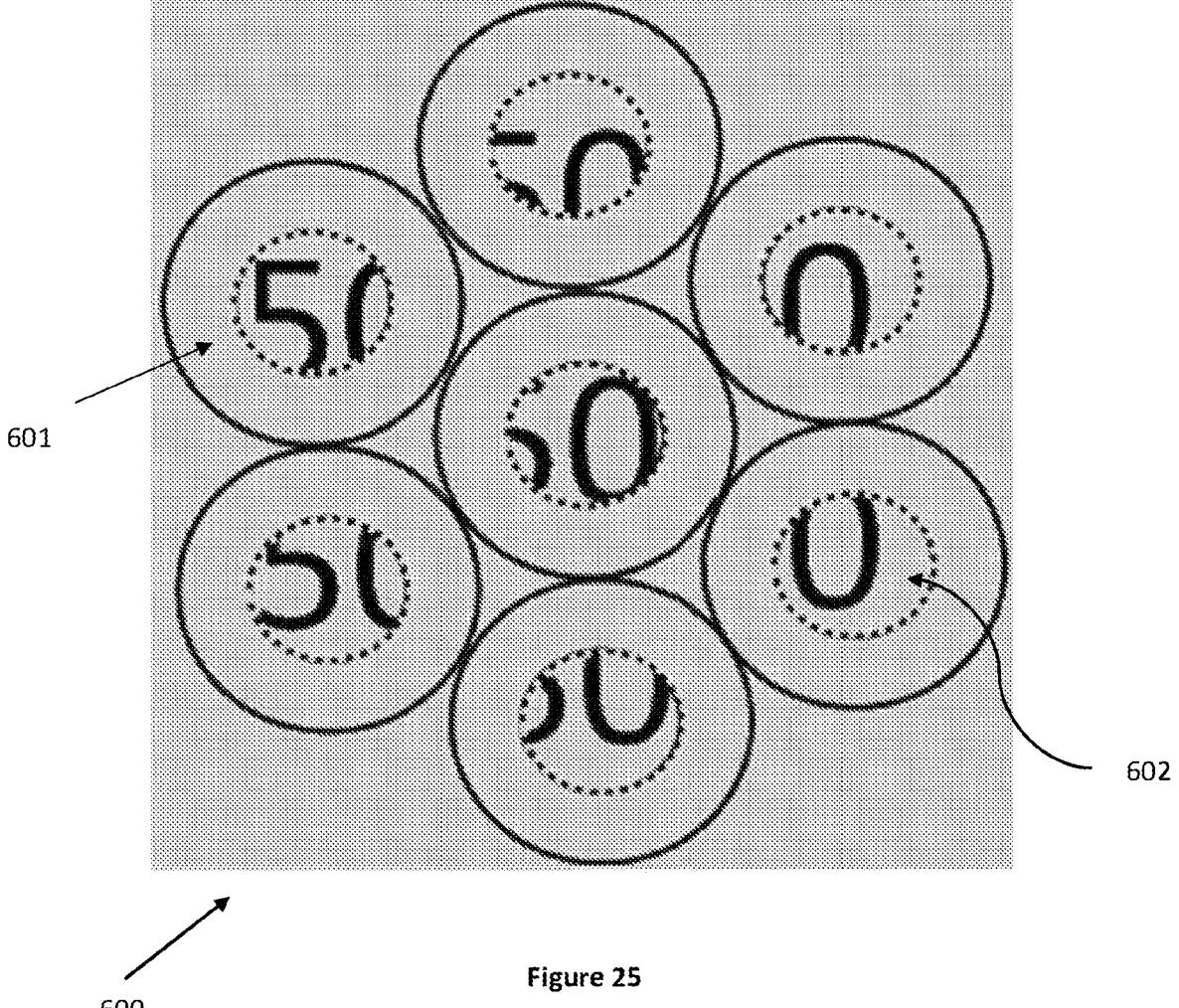
FIG. 25 shows a further embodiment of a micro-optic device including imagery elements formed in a selected surface portion of focusing elements.

FIG. 25 shows an example of such micro-optic device 600 including a hexagonal packed array of micro-focusing elements 601, and a centre region of each focusing element is allocated to be provided with imagery elements 602, whereas the remaining outer annular portion of each focusing element is free of any imagery elements. This arrangement allows the outer annular portion to perform its lens focusing action, that is, to focus on imagery elements provided in the circular centre region of each focusing element.

The imagery elements 602 of FIG. 25 are associated with a moire magnifying imagery design, and the micro-optic device 600 is to project a magnified image of the number 50 to a viewer. The contrast of the projected image is increased compared to an arrangement where the entire surface area of the focusing elements is provided with imagery elements. By confining the imagery elements to the centre region of the focusing elements, the range of available angles to view the projected image is reduced. It is envisaged that the projected image is viewable in a smaller viewing range close to the surface normal of the micro-optic device.

Figure 26A:
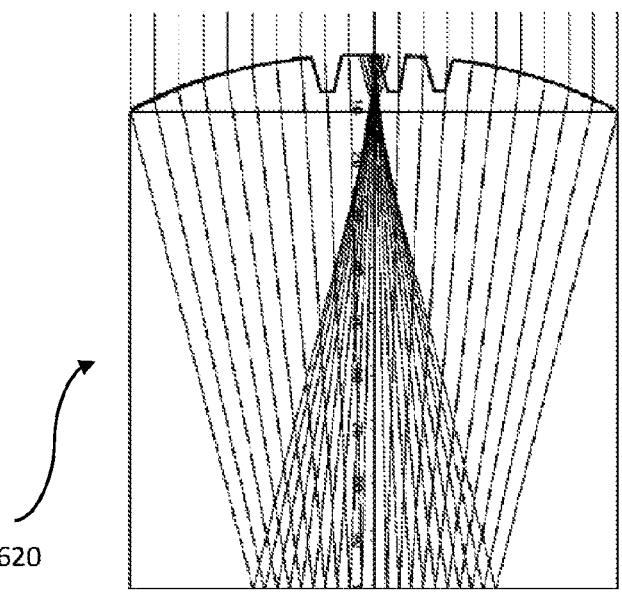
FIGS. 26A and 26B depict cross sections of the micro-optic device of FIG. 25.
Figure 26B:
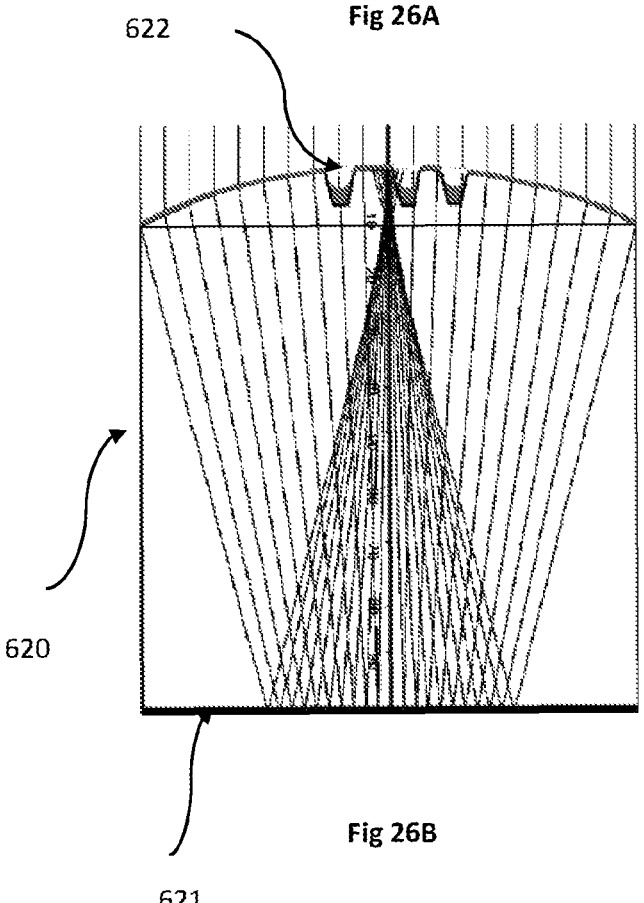

FIGS. 26A and 26B depict cross sections of the micro-optic device 600 of FIG. 25. For ease of illustration, only a single focusing element is depicted in the figures. FIG. 26A depicts a unitary structure 620 of the micro-optic device 600 without a reflecting surface, and without a coating of ink filled in the micro-structures, here the magnified image is relatively faint and is produced by incident light totally internally reflected from the lens reverse side of the substrate. FIG. 26B depicts the same micro-optic device 600 but including a reflective surface 621 on lens reverse side and also including overprinted translucent ink 622 deposited in the high curvature areas (mostly in the imagery structures). The imagery structures have slightly tapered side walls to allow easy release from an embossing tool, if the unitary structure 620 is formed by directly embossing into a curable material.

FIGS. 25, 26A and 26B show a circular centre portion of each optical element 601 being allocated for forming imagery elements 602. It should be appreciated that one or more portions of each focusing element can be allocated for forming imagery elements. The geometry of the portions can vary for each optical element within the unitary structure. The geometry of the portions including such imagery elements define the range of viewing angles that the micro-optic device can project.

A complementary arrangement to that shown in FIGS. 26a and b could also be used. For example, the imagery elements may be allocated to the outer annular portions of the focusing elements, and the inner circular portion could be left void of imagery elements. This arrangement will allow the projected image to be viewable at larger viewing angles relative to the surface normal of the device. This arrangement is advantageous because the imagery elements are now located closer to the bottom of the unitary structure, close to areas with high curvature or greatest local change in surface slope, therefore segregation of the overprinted ink (opaque or translucent) into the recessed imagery elements will be more efficient thus providing better image contrast.

Figure 27:
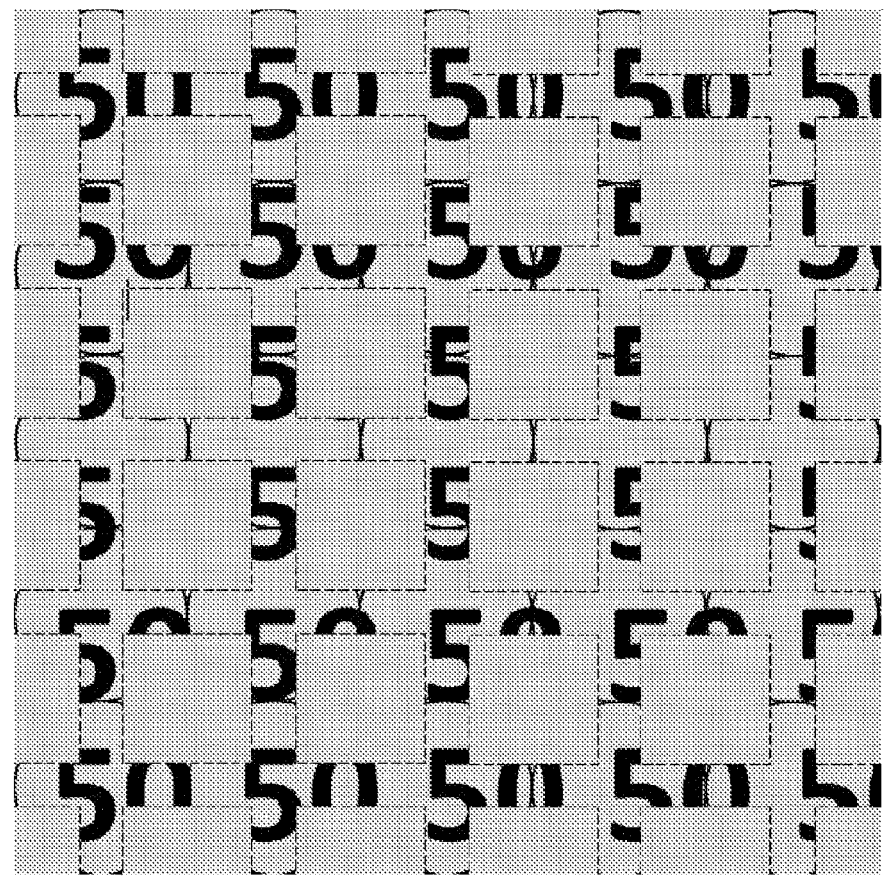
FIG. 27 shows a further embodiment of a micro-optic device including imagery elements formed in selected surface portions of focusing elements.

In another embodiment, the imagery elements are formed in a surface portion of the optical elements in the shape of a cross, such as that shown in FIG. 27. This arrangement allows a full range of viewing angles in both vertical and horizontal directions, with increased image contrast. For viewing angles substantially outside the vertical or the horizontal direction, no image is projected to the viewer.

The portions that include the imagery elements can be distributed regularly or randomly across the surface area of the focusing elements. For example, portions that include imagery elements could account for up to 50% of the surface area of the focusing elements, leaving the other 50% void of imagery elements and therefore surface interruptions. In the embodiments of FIGS. 25-27, the focusing elements within the same micro-optic device have the same surface portions that include their corresponding imagery elements.

In another embodiment, the focusing element regions allocated for forming imagery elements can be made flat, rather than retaining its original surface profile, to better assist with ink segregation into the recessed imagery elements. The flat areas including the imagery elements, either recessed or protruding imagery elements, may be made recessed from the lens structures, to better assist with ink segregation. The total device thickness and lens parameters are then selected so that the focal length of the focusing elements is made substantially equal to, or greater than, the sum of the following two distances: (1) distance from the lens vertex to the reflecting layer/lens reverse side; and (2) distance from reflecting layer/lens reverse side to the imagery structures.

Figure 28A:
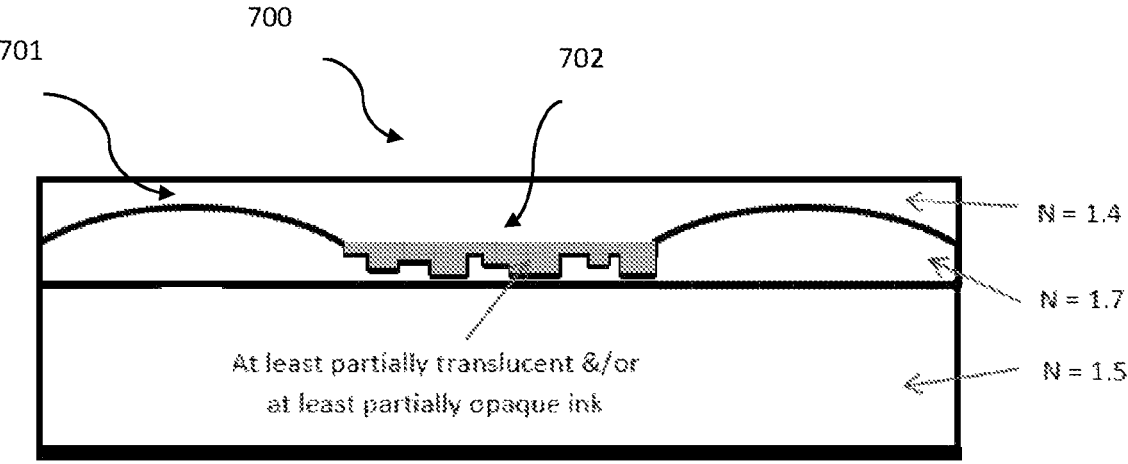
FIGS. 28A and 28B show a further embodiment of a micro-optic device wherein every alternate lens is void of imagery elements, and every alternate other lens is made flat and provided with imagery elements.
Figure 28B:
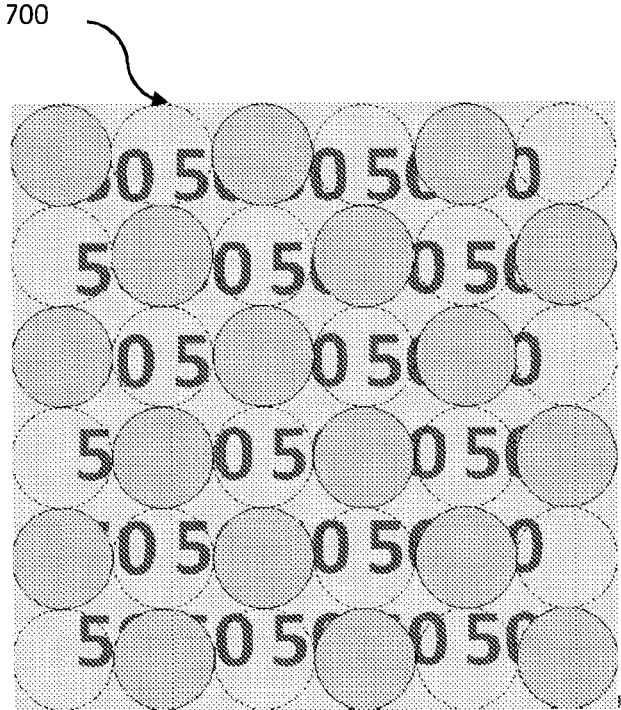

For example, the micro-optic device may comprise a regular array of convex or concave lenses, wherein every alternate lens is void of imagery elements, and every alternate other lens is made flat and formed with imagery elements. FIG. 28a depicts a cross-section 700 of such an arrangement, implemented with convex lenses 701 (similar arrangement can also be envisaged using concave shaped lenses). The imagery elements 702 are now entirely located in areas of highest curvature/greatest local change in surface slope, making ink segregation into these areas more efficient. In this example, the imagery elements 702 have varying depths therefore the projected image will have multiple grey levels. The projected image is visible at large viewing angles from the surface normal of the device. At viewing angles closer to the surface normal, no projected image is viewable. FIG. 28*b* depicts a plan view of the micro-optic device 700, with dashed lines representing the regions that have been flattened, and the imagery elements are located within dashed areas and are also present in gaps between adjacent focusing elements.

In one embodiment, the flat area is formed such that it is recessed with respected to the bottom of its adjacent focusing elements, to further improve the efficiency of ink segregation.

Figure 29:
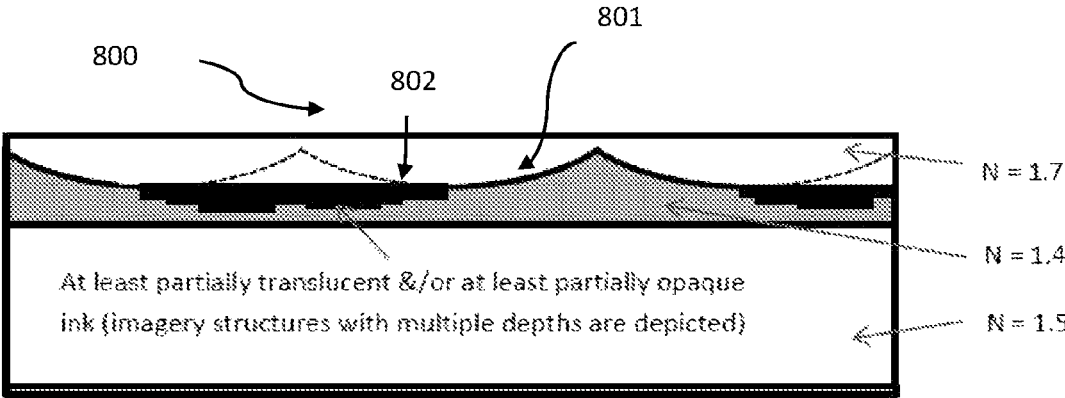
FIG. 29 shows a further embodiment of a micro-optic device in which a contiguous portion of two adjacent focusing elements is flattened to form imagery elements.

FIG. 29 illustrates another exemplary micro-optic device 800 in which some focusing elements 801 or portions of focusing elements 801 have been flattened. In this example, concave lenticular lenses are used, and the adjacent pair of concave lenses have their connecting portions flattened and formed with imagery elements 802. The dashed lines indicate portions of the concave lenticular lenses that have been flattened. This arrangement is advantageous because it produces magnified images over the full range of lenticular viewing angles. Additionally, because the imagery elements in this case are at the bottom of the unitary structure, the overprinted ink will, when applied with sufficient pressure and volume per unit area, segregate more efficiently into the imagery recesses. A similar arrangement can also be implemented with convex lenticular lenses. The same approach can also be used with 2D arrays of round lenses, either convex or concave lenses.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

It would be understood that the invention is not limited to the specific embodiments described herein, which are provided by way of example only. Scope of the invention is as defined by the claims appended hereto.

What is claimed is:

1. A micro-optic device for a security document, the micro-optic device being configured to produce a magnified image, including:
   a first unitary structure on one side of a substrate, the first unitary structure including a first group of refractive focusing elements and a first group of imagery elements,
   wherein one of the first group of refractive focusing elements and the first group of imagery elements is recessed with respect to the other,
   wherein the device further includes a first coating of ink overprinted on the first unitary structure, to at least partially fill the recessed group of refractive focusing elements or imagery elements, and
   wherein a property of the ink provides a visual contrast in the magnified image, wherein the first coating of ink is applied so as to completely cover the first unitary structure and have a planar outer surface.

2. The micro-optic device of claim 1, wherein the first coating of ink forms an integral component of the magnified image.

3. The micro-optic device of claim 1, wherein the property of the ink providing a visual contrast is a refractive index of the ink, wherein the refractive index of the ink is different to a refractive index of the unitary structure, and/or a colour of the ink.

4. The micro-optic device of claim 3, wherein the ink is at least partially transparent or translucent, or partially opaque, and/or tinted with colour.

5. The micro-optic device of claim 1, and further including a second overprinted coating of ink, the first and second overprinted coatings of ink having different colours that provide different visual contrasts in the magnified image.

6. The micro-optic device of claim 5, wherein the first and second overprinted coatings at least partially overlap.

7. The micro-optic device of claim 1, wherein the imagery elements are recessed into a surface of the refractive focusing elements, to form voids or grooves in the surface of the refractive focusing elements, and/or the refractive focusing elements are recessed with respect to the imagery elements.

8. The micro-optic device of claim 1, and further including an additional coating having a refractive index different to a refractive index of the first unitary structure, wherein the additional coating is applied so as to completely cover the first unitary structure and have a planar outer surface.

9. The micro-optic device of claim 1 wherein the imagery elements are positioned so that the refractive focusing elements focus or sample the imagery elements via light internally reflected within the substrate.

10. The micro-optic device of claim 1, wherein the first coating of ink overprinted on the first unitary structure is applied at a pressure and loading sufficient to at least partially fill the recessed group of refractive focusing elements or imagery elements.

11. The micro-optic device of claim 1, wherein the imagery elements are formed in a selected surface region of the refractive focusing elements, including: a centre region of the refractive focusing elements, an annular region of the refractive focusing elements, a cross-shaped region of the refractive focusing elements, or any random surface regions of the focusing elements.

12. The micro-optic device of claim 1, wherein one or more of the refractive focusing elements are flattened, such that a substantially flat surface is formed in these refractive focusing elements, and at least some of the imagery elements are formed in the substantially flat surfaces of the one or more refractive focusing elements.

13. The micro-optic device of claim 1, wherein one or more of the refractive focusing elements are partially flattened, such that a substantially flat surface is formed in each of the one or more refractive focusing elements, and at least some of the imagery elements are formed in the substantially flat surfaces of the refractive focusing elements.

14. The micro-optic device of claim 13, wherein the one or more refractive focusing elements are partially flattened in an edge portion of the refractive focusing elements, such that a contiguous flat portion is formed in two adjacent refractive focusing elements.

\* \* \* \* \*